US012562765B2

(12) United States Patent
Patel et al.

(10) Patent No.: US 12,562,765 B2
(45) Date of Patent: Feb. 24, 2026

---

(54) SPUR SUPPRESSION FOR MILLIMETER WAVE (mmW) RECEIVER

(71) Applicant: QUALCOMM Incorporated, San Diego, CA (US)

(72) Inventors: Chirag Dipak Patel, San Diego, CA (US); Gary Lee Brown, Jr., Carlsbad, CA (US); Rajagopalan Rangarajan, San Diego, CA (US); Mustafa Keskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 18/145,009

(22) Filed: Dec. 21, 2022

(65) Prior Publication Data

US 2024/0214016 A1 Jun. 27, 2024

(51) Int. Cl.
    *H04B 1/10*     (2006.01)
    *H04B 1/16*     (2006.01)
    *H04B 15/06*     (2006.01)

(52) U.S. Cl.
    CPC ................ *H04B 1/10* (2013.01); *H04B 1/16* (2013.01)

(58) Field of Classification Search
    CPC ... H04B 1/06; H04B 1/10; H04B 1/12; H04B 1/16; H04B 1/1615; H04B 1/163; H04B 1/1638; H04B 15/00; H04B 15/02; H04B 15/04; H04B 15/06; H03D 7/14; H03D 7/16; H03D 7/165; H03D 7/166
    See application file for complete search history.

(56) References Cited

U.S. PATENT DOCUMENTS

| | | | |
|---|---|---|---|
| 2003/0060160 A1 | 3/2003 | Yuan et al. | |
| 2012/0064824 A1 | 3/2012 | Jeong et al. | |
| 2013/0106641 A1* | 5/2013 | Warke ................. | H04L 27/0014 342/21 |
| 2014/0370833 A1 | 12/2014 | Din et al. | |
| 2015/0180521 A1 | 6/2015 | Tripurari et al. | |

(Continued)

FOREIGN PATENT DOCUMENTS

| | | |
|---|---|---|
| JP | H114122 A | 1/1999 |
| WO | 2020263478 A1 | 12/2020 |
| WO | 2021249626 A1 | 12/2021 |

OTHER PUBLICATIONS

International Search Report and Written Opinion—PCT/US2023/081191—ISA/EPO—Jul. 18, 2024.

(Continued)

*Primary Examiner* — Quochien B Vuong
(74) *Attorney, Agent, or Firm* — Polsinelli/Qualcomm Incorporated

(57) ABSTRACT

Aspects of the disclosure relate to devices, wireless communication apparatuses, methods, and other aspects of spur suppression in millimeter wave receivers. In one aspect a local oscillator (LO) source is coupled to a quadrature generation circuit having a first output for a first LO signal, and a second output for a second LO signal 90 degrees out of phase with the first LO signal. Each output is coupled to an LO driver, and outputs of the LO drivers a coupled at a first power connection to provide spur suppression associated with a phase difference between the first LO signal and the second LO signal. Similar connections are provided at outputs of first and second mixers for spur suppression.

28 Claims, 15 Drawing Sheets

(56) References Cited

U.S. PATENT DOCUMENTS

| 2016/0329921 | A1* | 11/2016 | Jussila .................. H04B 1/123 |
| 2019/0312604 | A1* | 10/2019 | Huang ..................... H04B 1/48 |
| 2020/0119693 | A1 | 4/2020 | Ezz et al. |
| 2020/0336159 | A1 | 10/2020 | Weissman et al. |
| 2021/0297303 | A1* | 9/2021 | Jiang .................... H04L 27/364 |
| 2022/0094451 | A1 | 3/2022 | Wang et al. |

OTHER PUBLICATIONS

Mori K., et al., "Direct Conversion Receiver for Digital Beamform-
ing at 8.45GHz", 2001 IEEE MTT-S International Microwave
Symposium Digest. (IMS 2001), Phoenix, AZ, May 20-25, 2001,
New York, NY, IEEE, US, May 20, 2001, pp. 1375-1378, XP001067481,
Section III, figures 2, 3.
Partial International Search Report—PCT/US2023/081191—ISA/
EPO—Mar. 22, 2024.

\* cited by examiner

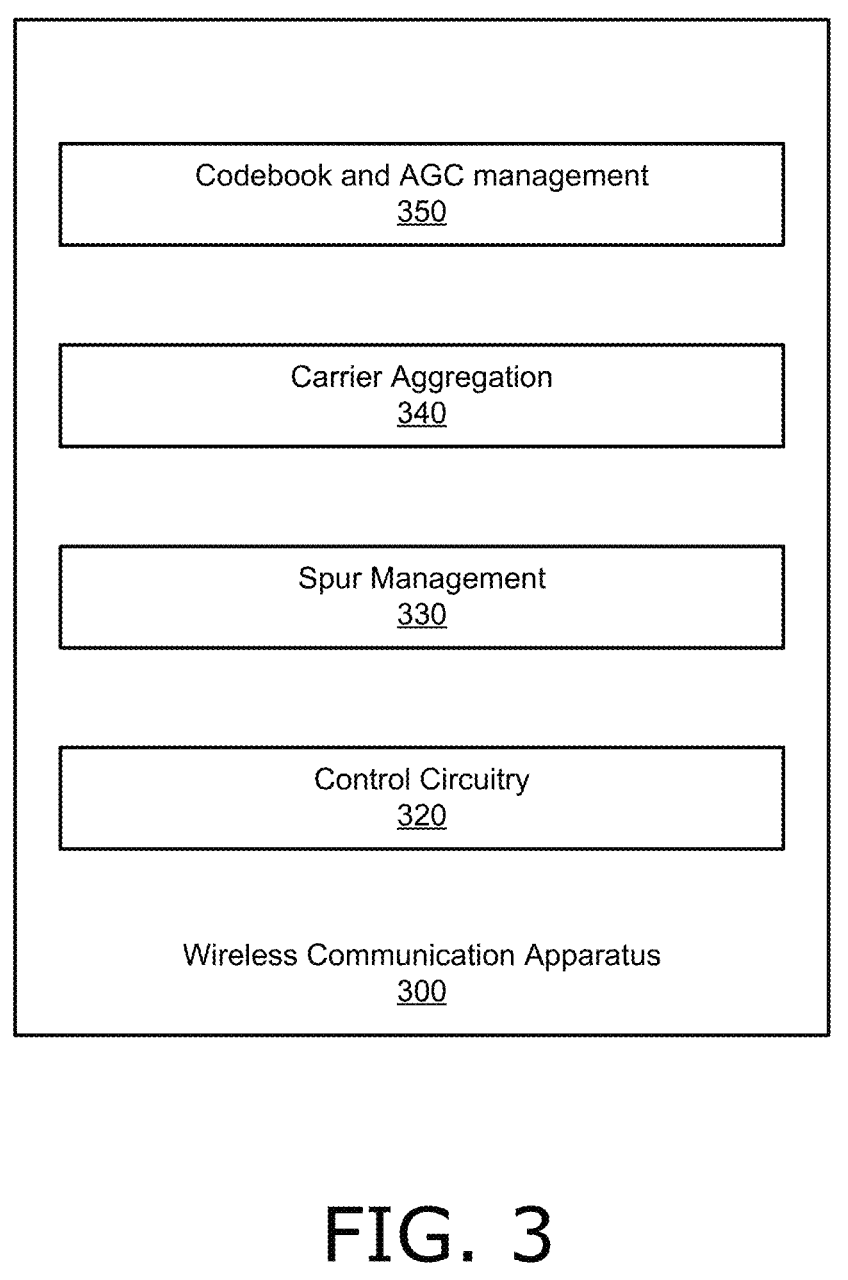

Codebook and AGC management
350

Carrier Aggregation
340

Spur Management
330

Control Circuitry
320

Wireless Communication Apparatus
300

FIG. 3

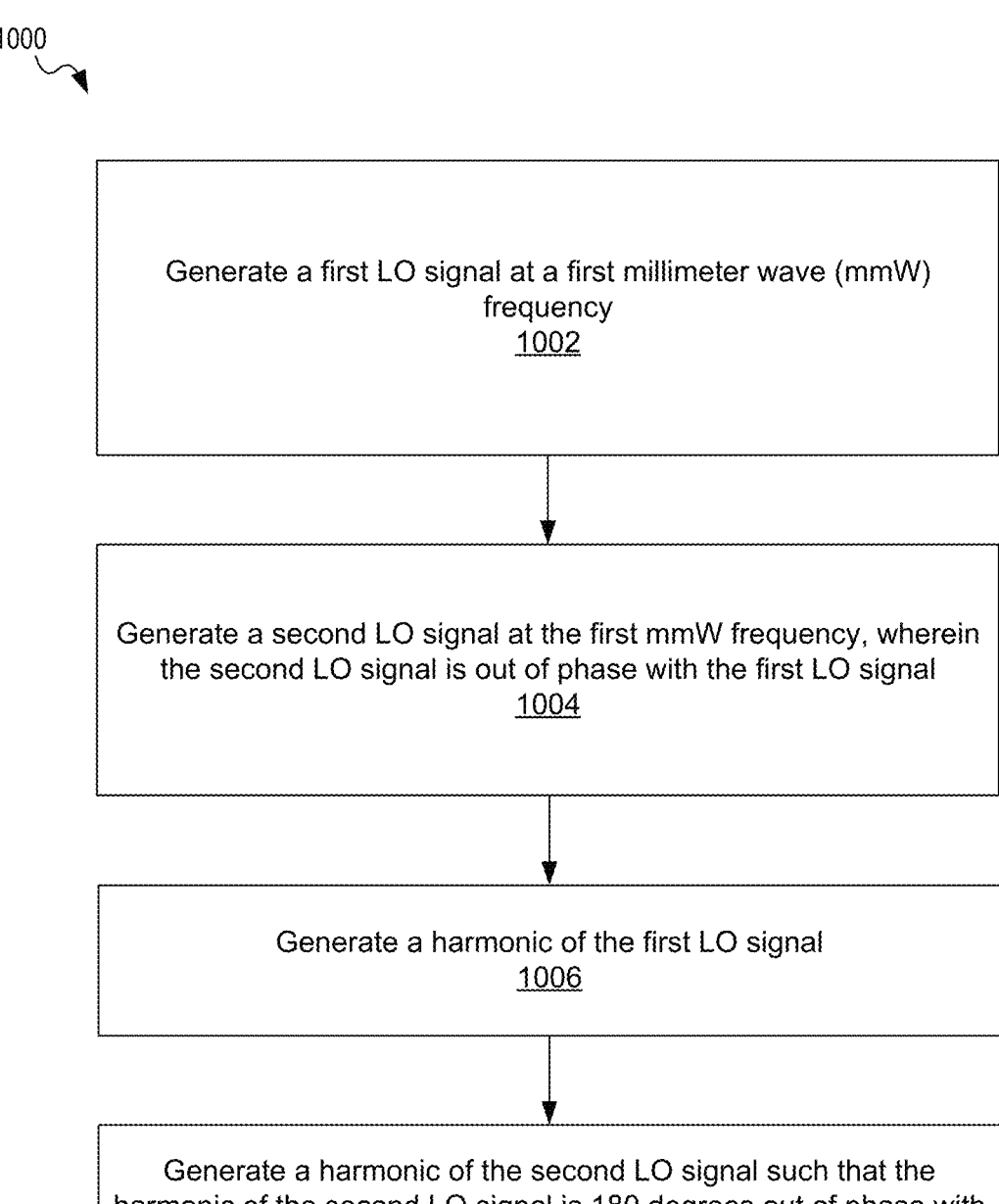

1000

Generate a first LO signal at a first millimeter wave (mmW) frequency
1002

Generate a second LO signal at the first mmW frequency, wherein the second LO signal is out of phase with the first LO signal
1004

Generate a harmonic of the first LO signal
1006

Generate a harmonic of the second LO signal such that the harmonic of the second LO signal is 180 degrees out of phase with the harmonic of the first LO signal with a matching amplitude
1008

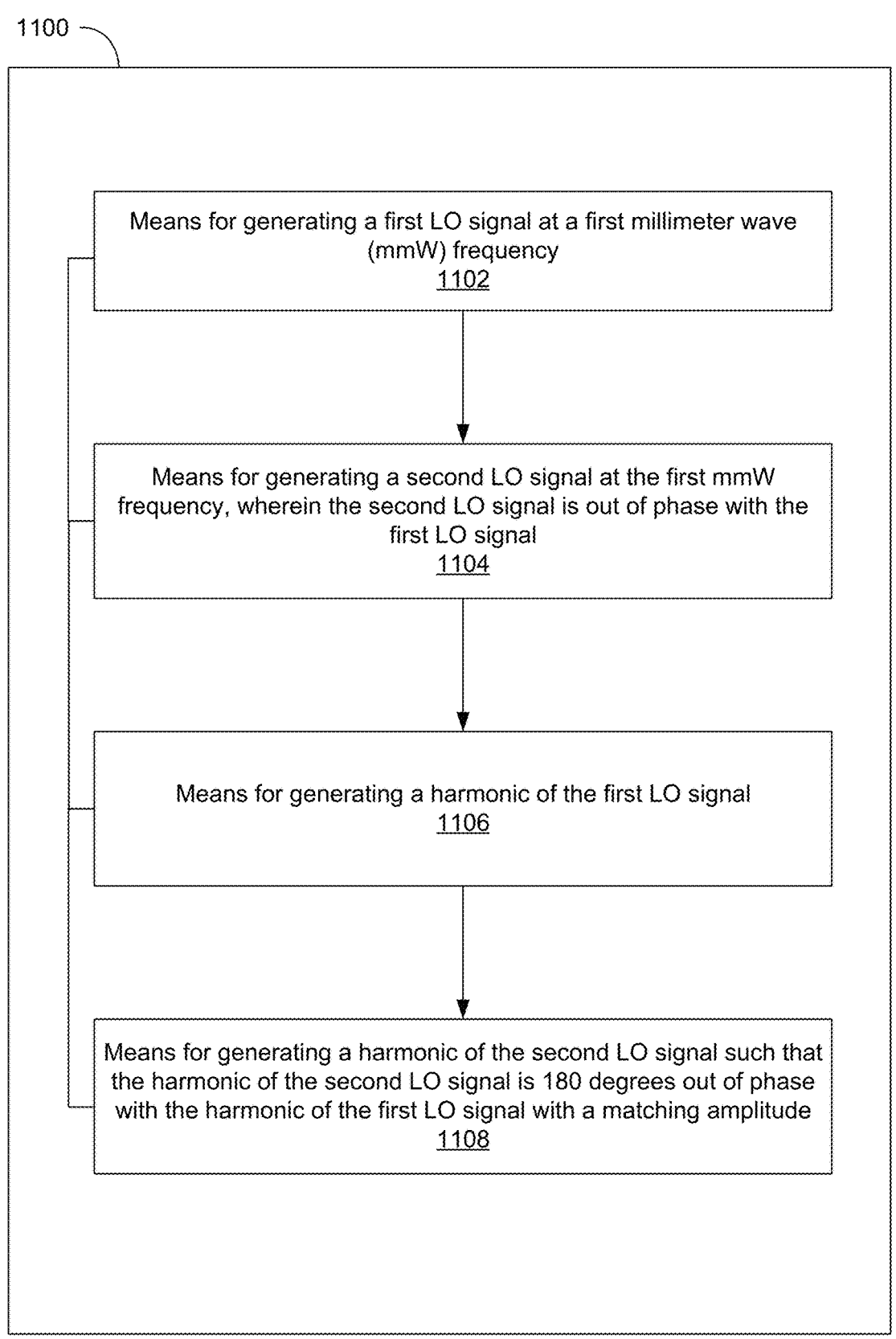

Means for generating a first LO signal at a first millimeter wave (mmW) frequency
1102

Means for generating a second LO signal at the first mmW frequency, wherein the second LO signal is out of phase with the first LO signal
1104

Means for generating a harmonic of the first LO signal
1106

Means for generating a harmonic of the second LO signal such that the harmonic of the second LO signal is 180 degrees out of phase with the harmonic of the first LO signal with a matching amplitude
1108

FIG. 11

SPUR SUPPRESSION FOR MILLIMETER WAVE (mmW) RECEIVER

FIELD

The present disclosure relates generally to electronics and wireless communications. For example, aspects of the present disclosure relate to millimeter wave (mmW) communications, and signal quality in mmW receivers.

BACKGROUND

Wireless communication devices and technologies are becoming ever more prevalent. Wireless communication devices generally transmit and receive communication signals. A communication signal is typically processed by a variety of different components and circuits. In some modern communication systems, many different wavelengths of electromagnetic waves can be used in a single device and specialized transmit and receive configurations can be used to generate and receive orthogonal signals in the same wireless paths. Providing consistent signals of sufficient quality to meet communication performance targets in such environments can involve additional complexity in a wireless communication system.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Disclosed are systems, apparatuses, methods, computer readable medium, and circuits for suppressing spurious signals. In at least one aspect, a millimeter wave (mmW) receiver is provided. The mmW receiver comprises a local oscillator (LO) generator, a splitter coupled to the LO generator configured to output a first LO signal from a first output and a second LO signal from a second output, a 90-degree phase shifter having an output and an input coupled to the second output of the splitter, a radio frequency (RF) input, a first mixer having an output, a first input coupled to the RF input, and a second input coupled to the first output of the splitter, a second mixer having an output, a first input coupled to the RF input, and a second input coupled to the output of the 90-degree phase shifter, a 180-degree phase shifter having an output and an input coupled to the output of the second mixer, and a combiner element having an intermediate frequency (IF) output, a first input coupled to the output of the first mixer, and a second input coupled to the output of the 180-degree phase shifter.

According to another aspect, a method for operation of a wireless communication apparatus is provided. The method includes generating a first LO signal at a first millimeter wave (mmW) frequency, generating a second LO signal at the first mmW frequency, wherein the second LO signal is out of phase with the first LO signal, generating a harmonic of the first LO signal, and generating a harmonic of the second LO signal such that the harmonic of the second LO signal is 180 degrees out of phase with the harmonic of the first LO signal with a matching amplitude.

According to another aspect, a mmW communication apparatus is provided. The mmW communication apparatus includes, a local oscillator (LO) source having an LO output for an LO signal: splitter phase shifting circuitry having an input coupled to the LO output, and a plurality of outputs, the plurality of outputs including at least a first output for a first LO signal, and a second output for a second LO signal, wherein each output of the plurality of outputs other than the first output is configured with a signal out of phase the first LO signal: a plurality of LO drivers, each LO driver of the plurality of LO drivers comprising corresponding an LO driver input coupled to a corresponding output of the plurality of outputs of the splitter phase shifting circuitry: and one or more power connections coupled between groupings of outputs of the plurality of LO drivers, wherein the one or more power connections provide spur suppression associated with a phase difference between the outputs of the plurality of LO drivers in an associated grouping.

According to another aspect, a mmW communication apparatus is provided. The apparatus includes a local oscillator (LO) source having an LO output for an LO signal: a quadrature generation circuit having an input coupled to the LO output, a first output for a first LO signal, and a second output for a second LO signal, wherein the second LO signal is 90 degrees out of phase with the first LO signal: a first LO driver having a first LO output and a first LO input, wherein the first LO input is coupled to the first output of the quadrature generation circuit: a second LO driver having a second LO output and a second LO input, wherein the second LO input is coupled to the second output of the quadrature generation circuit: a first power connection coupled to the first LO output and the second LO output: a first mixer having a first mixer LO input, a first mixer radio frequency (RF) input, and a first mixer output, wherein the first mixer LO input is coupled to the first LO output, and wherein the first mixer RF input is coupled to an RF signal source: a second mixer having a second mixer LO input, a second mixer RF input, and a second mixer output, wherein the second mixer LO input is coupled to the second LO output, and wherein the first mixer RF input is coupled to a dummy RF load: and a second power connection coupled to the first mixer output and the second mixer output.

In some such examples, the communication apparatus operates where the LO source, the quadrature generation circuit, the first LO driver, the second LO driver, the first power connection, the first mixer, the second mixer and the second power connection are associated with a first channel of a carrier aggregation (CA) receiver.

In some such examples, the communication apparatus further includes a second IF input configured to provide a second IF signal from a second LO path and a second RF input associated with a second channel of the CA receiver; and an IF output, wherein the IF output is coupled to the second IF input, and wherein the IF output is further coupled to the first mixer IF output via a first IF input.

In some such examples, the communication apparatus further includes an analog-to-digital converter configured to convert a merged IF signal for the first channel and the second channel from an analog RF signal to a digital signal.

In some such examples, the communication apparatus further includes a modem circuit coupled to an output of the analog-to-digital converter.

In some such examples, the communication apparatus further includes control circuitry coupled to the second LO driver and the second mixer, wherein the control circuitry is configured to set the second LO driver and the second mixer to a low power off state when the wireless communication apparatus is configured for an operating state without suppression of spurs.

In some such examples, the communication apparatus operates where first power connection is coupled to the first LO output via a first inductive element, and wherein the second LO output is coupled to the first power connection via a second inductive element different than the first inductive element.

In some such examples, the communication apparatus operates where the first mixer IF output and the second mixer IF output are coupled to the second power connection via a shared inductive element.

In some such examples, the communication apparatus operates where the first mixer IF output is coupled to the second power connection via a third inductive element, and wherein the second mixer IF output is coupled to the second power connection via a fourth inductive element different than the third inductive element.

In some such examples, the communication apparatus operates where the dummy RF load comprises a resistor matched to an input resistance associated with the RF signal source.

In some such examples, the communication apparatus operates where the RF signal source comprises one or more receiver input configured to provide RF signals at frequencies between 37 gigahertz (GHz) and 43.5 GHz.

In some such examples, the communication apparatus operates where the RF signal source comprises one or more receiver input configured to provide RF signals at frequencies between 24 gigahertz (GHz) and 29.5 GHz.

In some such examples, the communication apparatus further includes one or more millimeter wave (mmW) antennas coupled to the first mixer RF input as part of the RF signal source.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 3 is a block diagram illustrating aspects of a wireless communication apparatus with spur suppression for mmW receivers, according to aspects described herein.

FIG. 10 is a flow diagram describing an example of the operation of a method for operation of a wireless communication apparatus with a receiver having spur suppression for mmW functionality, according to aspects described herein.

FIG. 11 is a functional block diagram of a wireless communication apparatus configured for spur suppression for mmW receivers, according to aspects described herein.

DETAILED DESCRIPTION

Figure 1:
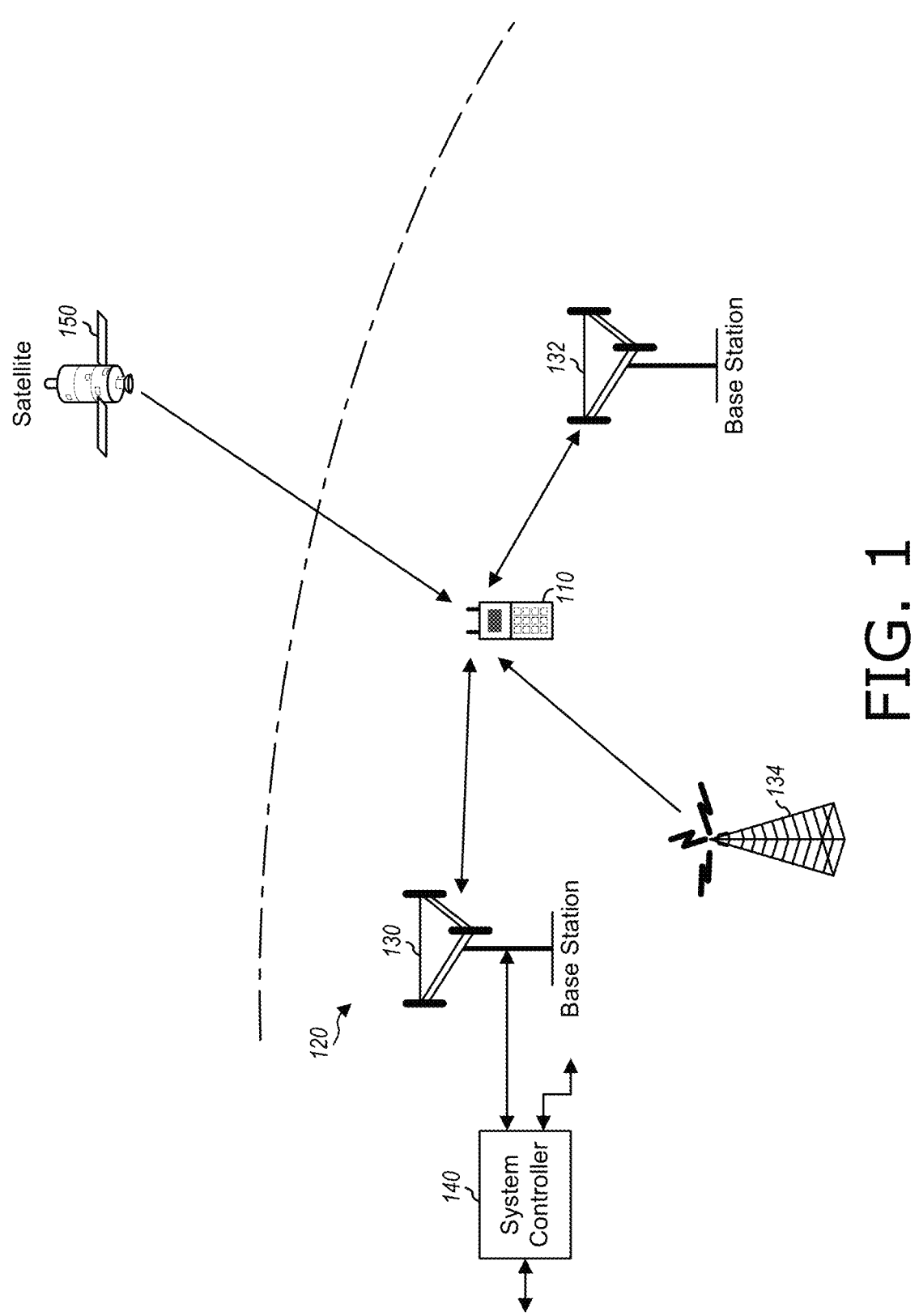
FIG. 1 is a diagram showing a wireless communication system including multiple devices that can be implemented with spur suppression for millimeter wave (mmW) receivers (e.g., mmW carrier aggregation (CA) receivers), according to aspects described herein.

The detailed description set forth below in connection with the appended drawings is intended as a description of exemplary implementations and is not intended to represent the only implementations in which the invention may be practiced. The term "exemplary" used throughout the description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

Cellular communication systems, such as Third Generation Partnership Project (3GPP) standardized communications, can use different frequencies (e.g., carriers) to communicate data between devices. The use of such multiple carrier or multiple frequency communications can include carrier aggregation (CA). In certain millimeter wave (mmW) receivers, separate local oscillator (LO) signals are used to downconvert signals on different carriers. Spurious LO signals (e.g., harmonics of an LO signal) associated with one carrier can leak through circuitry of a receiver to impact data associated with a different carrier. Such LO leakage signals can be referred to as spurs, and when present in a design, can render certain frequency combinations unusable.

Aspects described herein provide receiver paths that can be used to suppress or cancel out spurs (whether due to CA operation or caused by other operation), improving the operation of communication devices by reducing spur noise that may otherwise render certain carriers unusable. In some aspects, a dummy path is added to an LO path associated with a spur. An LO signal on the dummy path may be in quadrature phase with the primary LO signal. Both LO signals may be connected to the same power supply, so that any signals propagated through the power supply (e.g., harmonic spurs) cancel each other out or suppress each other. Switching can be added to the dummy path so that when combinations of (e.g., CA) channels are used that are immune to the spurs associated with the LO, the dummy path can be turned off to reduce power consumption associated with spur suppression. In designs with complex combinations of carriers, such spur suppression circuitry can be added to one or more LO generation paths that cause spurs that may impact carriers in a given combination. In some cases, the spur suppression circuitry can be left out of LO generation paths that do not cause spurs in active (CA) combinations (e.g., spurs may be created, but are out of band for any relevant signal, and so do not impact communication performance). According to aspects described herein, a circuit design can allow targeted inclusion of spur suppression circuitry to achieve acceptable performance. In some aspects, spur suppression can be turned off for combinations of carriers where the suppression is not needed for acceptable performance or left out of LO generation paths where no combination of carriers uses spur suppression for adequate performance.

As an alternative to or in addition to the aspects described above, aspects can be implemented as an image rejection mixer in the LO path, with switching to allow part of the image rejection mixer to be turned off when spur suppression associated with the additional image rejection circuitry (e.g., similar to the dummy path described above) is not needed for device performance. Such an implementation can use additional power and add additional complexity to allow additional flexibility in the spur suppression frequencies as well as intermediate frequency (IF) filtering, while scaling back when it is unneeded to preserve power and performance.

Various aspects of the application will be described with respect to the figures.

FIG. 1 is a diagram showing a communication system 120 that can include devices that can implement spur suppression for receiver that processes mmW signals in accordance with aspects described herein. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA IX, Evolution-Data Optimized (EVDO), Time Division Synchronous CDMA (TD-SCDMA), or some other version of CDMA. For simplicity, FIG. 1 shows wireless communication system 120 including base stations 130 and 132, and one system controller 140. In general, a wireless communication system may include any number of base stations, and any set of other network entities.

A wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to couple to one or more other devices (for example through the internet of things), a wireless local loop (WLL) station, a Bluetooth device, consumer premises equipment (CPE), an automobile or device therein, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA IX, EVDO, TD-SCDMA, GSM, 802.11, 802.15, 5G, etc.

Figure 2:
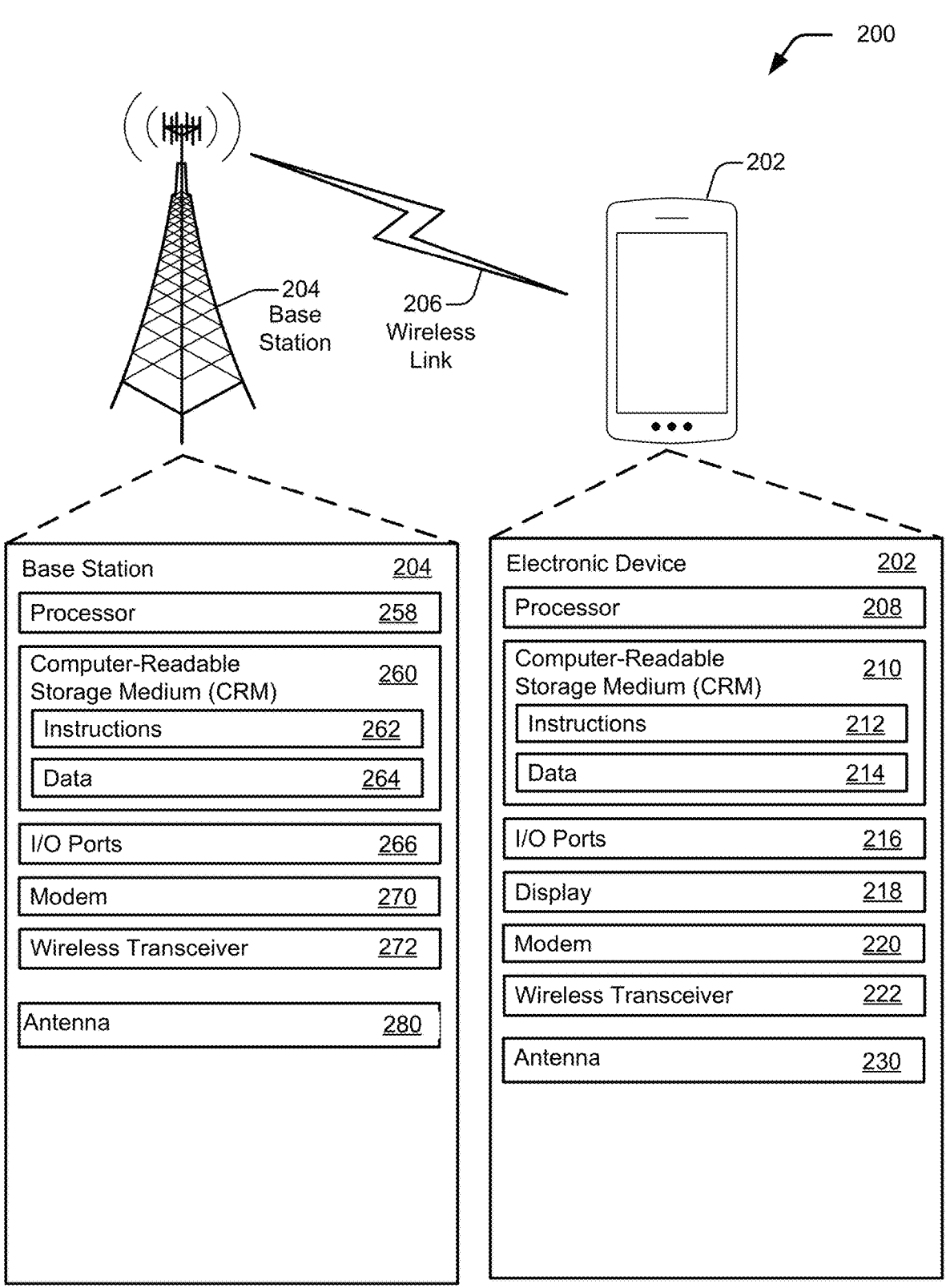
FIG. 2 is a diagram showing a wireless communication system including devices that can be implemented with spur suppression for mmW receivers, according to aspects described herein.

FIG. 2 is a diagram illustrating an environment 200 that includes an electronic device 202 and a base station 204. The environment 200 can be part of the system 120, the device 202 can be similar to the device 110, and the base station 204 can be similar to the base stations (e.g., 130, 132) of FIG. 1. While a base station 204 and an electronic device 202 are described, in accordance with aspects described herein, similar wireless links 206 can apply between base stations or directly between electronic devices (e.g., such that no communication through a network is required). Spur suppression as described herein can be used with wireless access point (WAP) devices, such as when electronic device 202 is a WAP device that communicates with additional devices via a wireless local area network and provides access to the Internet via the wireless link 206. Spur suppression as described herein can enable (e.g., CA) frequency combinations that provide significant additional bandwidth to the electronic device 202, which provide valuable performance when the electronic device 202 functions as a WAP to provide connectivity to multiple other devices. In the example of FIG. 2, the electronic device 202 may be implemented as any suitable computing or other electronic device, such as a cellular base station, broadband router, access point, cellular or mobile phone, gaming device, navigation device, media device, laptop computer, desktop computer, tablet computer, server, WAP device, network-attached storage (NAS) device, smart appliance, vehicle-based communication system, Internet-of-Things (IOT) device, CPE, and so forth.

The base station 204 communicates with the electronic device 202 via the wireless link 206, which may be implemented as any suitable type of wireless link. Although depicted as a base station tower of a cellular radio network, the base station 204 may represent or be implemented as another device, such as a satellite, cable television head-end, terrestrial television broadcast tower, access point, peer-to-peer device, mesh network node, router, fiber optic line, another electronic device generally, and so forth. Hence, the electronic device 202 may communicate with the base station 204 or another device via a wired connection, a wireless connection, or a combination thereof.

The wireless link 206 can include a downlink of data or control information communicated from the base station 204 to the electronic device 202 and an uplink of other data or control information communicated from the electronic device 202 to the base station 204. The wireless link 206 may be implemented using any suitable communication protocol or standard, such as 3rd Generation Partnership Project Long-Term Evolution (3GPP LTE), 5G New Radio (3GPP 5GNR), IEEE 802.11, IEEE 802.16, Bluetooth™, and so forth.

The electronic device 202 includes a processor 208 and a computer-readable storage medium (CRM 210). The processor 208 may include any type of processor, such as an application processor or a multi-core processor, that is configured to execute processor-executable instructions (e.g., code) stored by the CRM 210. The CRM 210 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 210 is implemented to store instructions 212, data 214, and other information of the electronic device 202, and thus does not include transitory propagating signals or carrier waves.

The electronic device 202 may also include input/output ports 216 (I/O ports 216) and/or a display 218. The I/O ports 216 enable data exchanges or interaction with other devices, networks, or users. The I/O ports 216 may include serial ports (e.g., universal serial bus (USB) ports), parallel ports, audio ports, infrared (IR) ports, and so forth. The display 218 can be realized as a screen or projection that presents graphics, e.g., one or more graphical images, of the electronic device 202, such as for a user interface associated with an operating system, program, or application. Alternatively, or additionally, the display 218 may be implemented as a display port or virtual interface through which graphical content of the electronic device 202 is communicated or presented.

For communication purposes, the electronic device 202 also includes a modem 220, a wireless transceiver 222, and at least one an antenna 230. The wireless transceiver 222 provides connectivity to respective networks and other electronic devices connected therewith using RF wireless signals. Additionally, or alternatively, the electronic device 202 may include a wired transceiver, such as an Ethernet or fiber optic interface for communicating over a personal or local network, an intranet, or the Internet. The wireless transceiver 222 may facilitate communication over any suitable type of wireless network described herein.

The modem 220, such as a baseband modem, may be implemented in a system on-chip (SoC) that provides a digital communication interface for data, voice, messaging, and other applications of the electronic device 202. The modem 220 may also include baseband circuitry to perform high-rate sampling processes that can include analog-to-digital conversion (ADC), digital-to-analog conversion (DAC), gain correction, skew correction, frequency translation, and so forth. The modem 220 may also include logic to perform in-phase/quadrature (I/Q) operations, such as synthesis, encoding, modulation, demodulation, and decoding. More generally, the modem 220 may be realized as a digital signal processor (DSP) or a processor that is configured to perform signal processing to support communications via one or more networks. Alternatively, ADC or DAC operations may be performed by a separate component or another illustrated component, such as the wireless transceiver 222.

The wireless transceiver 222 can include circuitry, logic, and other hardware for transmitting or receiving a wireless signal for at least one communication frequency band. In operation, the wireless transceiver 222 can implement at least one radio-frequency transceiver unit to process data and/or signals associated with communicating data of the electronic device 202 via the antenna 230. Generally, the wireless transceiver 222 can include filters, switches, amplifiers, mixers, and so forth for routing and processing signals that are transmitted or received via the antenna 230. Generally, the wireless transceiver 222 includes multiple transceiver units (e.g., for different wireless protocols such as WLAN versus WWAN or for supporting different frequency bands or frequency band combinations).

Elements of the electronic device 202 are described above, and the base station 204 can have similar corresponding elements, in addition to any other elements that support base station functionality. The processor 258 can have similar structure and function as the processor 208, and CRM 260 along with instructions 262 and data 264 can have similar structure and function as the CRM 210, the instructions 212, and the data 214. I/O ports 266 and modem 270 can have similar structure and function to the I/O ports 216 and the modem 220 above. A wireless transceiver 272 can be coupled to an antenna 280. The transceiver 272 can include structures for implementing a 3GPP standard or other communication structures described above for base stations. Either the electronic device 202 or the base station 204 (or both) can be configured as or include implementations of wireless communication apparatuses with receivers having spur suppression in accordance with aspects described herein.

FIG. 3 is a block diagram illustrating aspects of a wireless communication apparatus with spur suppression for mmW receivers in accordance with aspects described herein. FIG. 3 shows a wireless communication apparatus 300 including blocks that operate to provide spur suppression for multi-frequency mmW communications. The wireless communication apparatus 300 can be an element of any device or station (e.g., base stations 130, 132, 204 or electronic device 202), as part of wireless communication systems. As described above, mmW or higher frequency wireless communications can use multiple frequencies for increased data throughput. Aspects described herein include switchable circuitry that can be added into a receiver design to suppress such spurs when the cause an impact on performance, at a cost of additional circuit space and added power consumption. When the spurs do not impact performance, the switches can turn off the spur suppression circuitry, lessening the power usage associated with the spur suppression. Additionally, while aspects described herein include implementations related to mmW communications, other aspects are not limited to mmW or higher frequencies, and some implementations may particularly operate at frequencies around or below 6 gigahertz (GHz), or in the FR3 range.

To implement such spur suppression, the apparatus 300 includes a codebook and automatic gain control (AGC) management block 350, a multi-frequency block (illustrated as carrier aggregation block 340 as a non-limiting example), a spur management block 330, and control circuitry 320. Such an apparatus or other similar apparatuses can include other blocks, such as a MIMO block to support additional communications system to improve performance. In some implementations, aspects described herein may be used to reduce or suppress spurs for a MIMO system that does not implement or is not using multiple frequencies.

As mentioned above, a communication system using CA, along with other cellular communication technologies, can use multiple communication bandwidths and/or other technologies such as MIMO to increase communication performance. A codebook and AGC management block 350 includes available combinations of communication technologies, including available carriers for CA or other multi-frequency communication, and the power limits (e.g., AGC settings) for various combinations to comply with regulations and device operations. As described above, the combinations of channels available and managed by the codebook and AGC management block can include spurs from one channel in a combination that will interfere with other channels in a combination. Carrier aggregation block 340 can use the information from the codebook and AGC management block 350 to implement CA communication operations, and spur management block 330 can identify LO generation paths associated with a given combination that create spurs that interfere with another carrier in a given combination. When information from the above blocks is used to set a given CA operation, along with identification of a spur for the combination, the control circuitry 320 can be used to set switches within the wireless communication apparatus to suppress the spurs for a given CA communication. Similar operation may be conducted for non-CA multi-frequency communication and/or for MIMO communication.

Figure 4:
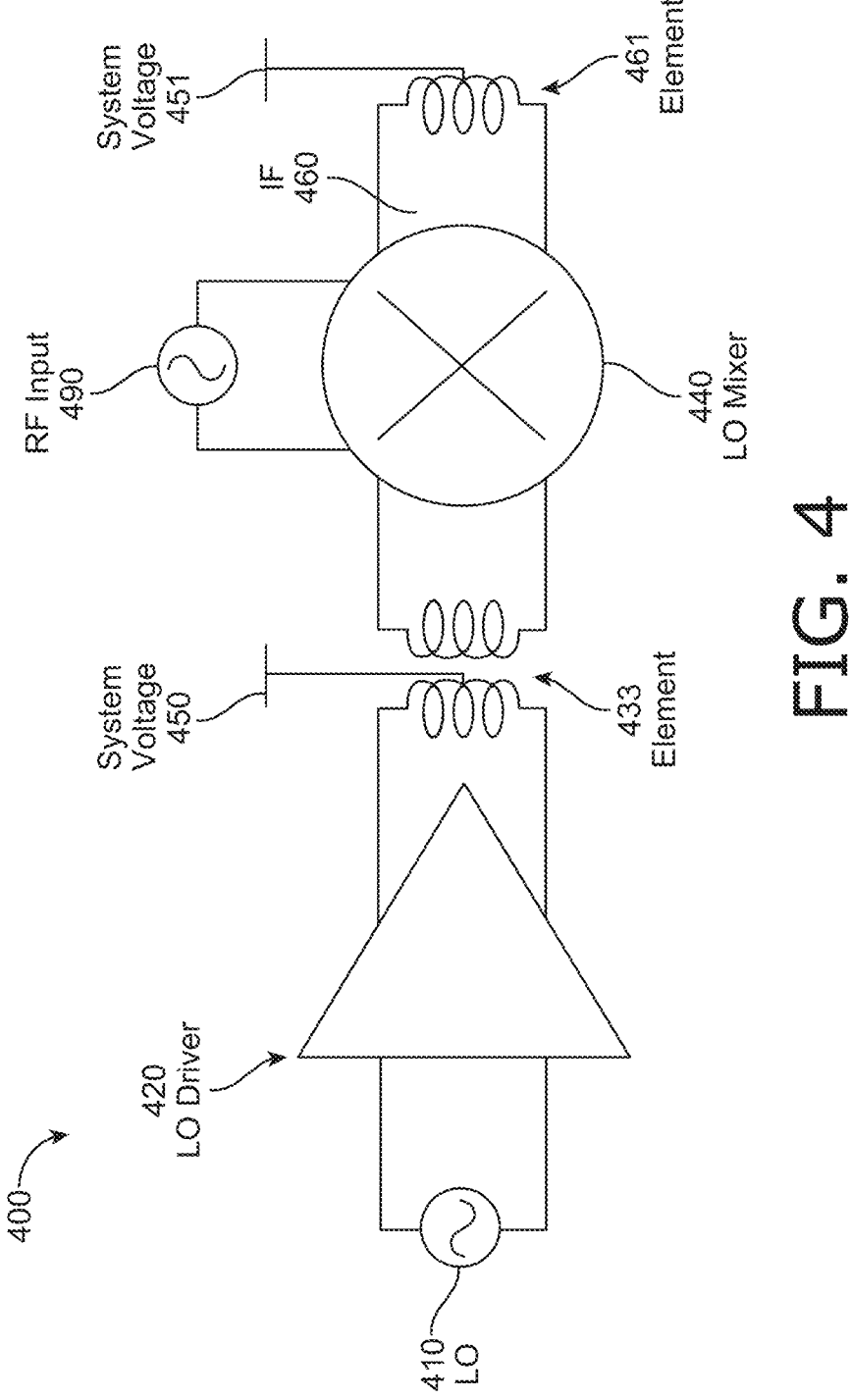
FIG. 4 illustrates aspects of a signal path for use with mmW receivers, according to aspects described herein.

FIG. 4 illustrates aspects of a path 400 for use with mmW receivers in accordance with aspects described herein. The path 400 includes a local oscillator (LO) 410, an LO driver 420, a connecting element 433 (e.g., an inductive element or path in a device layout) attached to a system voltage 450 (e.g., VDD), an LO mixer 440, a radio frequency (RF) input 490, an intermediate frequency (IF) element or interface 460 (e.g., an IF output signal), and an element 461 attached to a system voltage 451 (e.g., VDD or another system voltage).

The LO 410 generates a local oscillator signal that is input to the LO driver 420 for amplification. The LO driver 420 outputs an amplified LO signal for input to the LO mixer 440 for mixing with a received RF communication signal from RF input 490 to generate an intermediate frequency (IF) signal. Both the LO driver 420 and the LO mixer 440 include connections to a system voltage that provides power at the corresponding connections of system voltage 450 via element 433, and system voltage 451 via element 461. A stand-alone path (e.g., excluding consideration of other CA receive paths discussed later) as illustrated can generate harmonic spurs at multiples of the frequency of the signal from LO 410. The harmonic spurs from the LO driver 420 or the LO mixer 440 can be propagated through the connections of the system voltage 450 and the system voltage 451 to other portions of a device, or through other connections or couplings, adding noise that can impact device performance.

Figure 5:
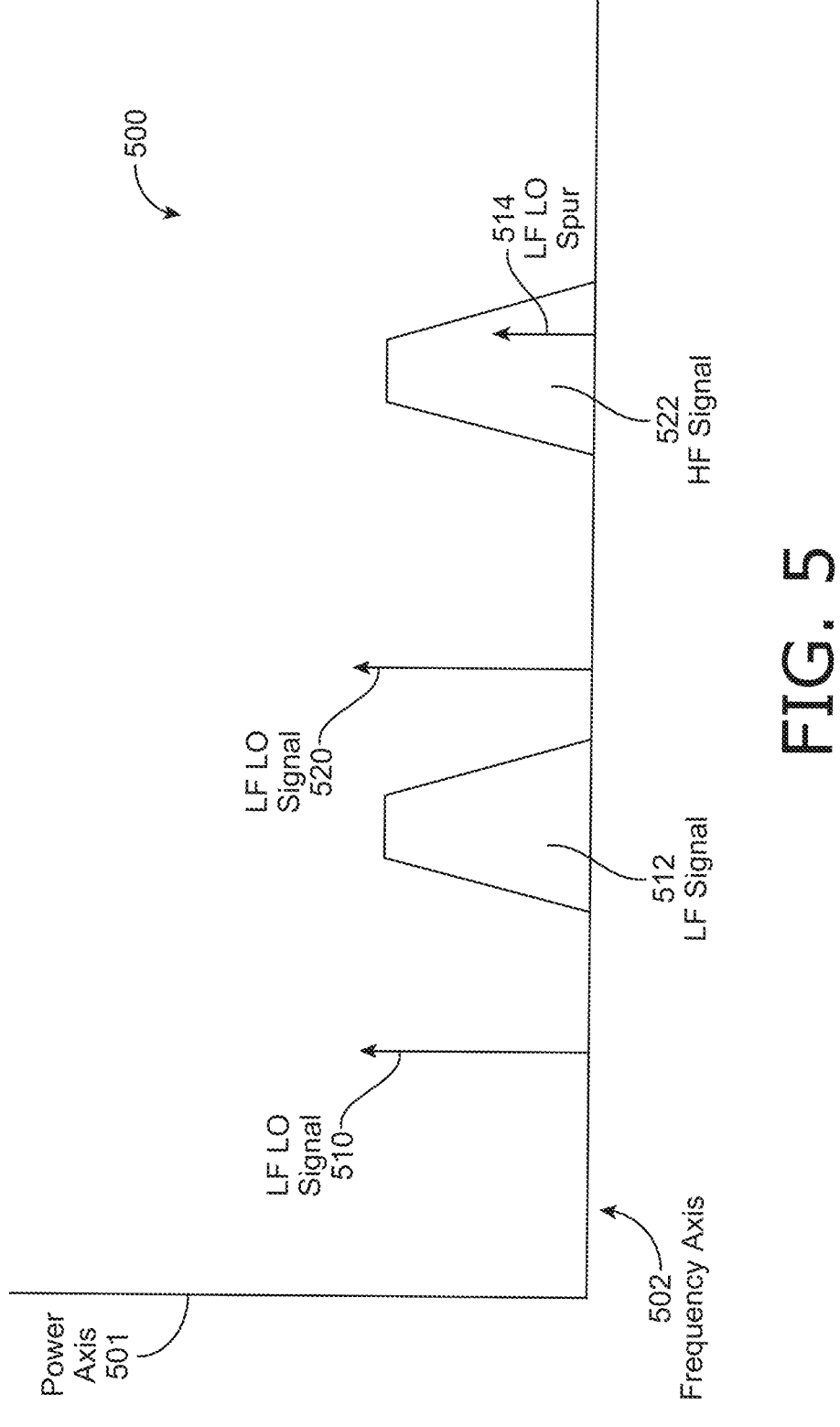
FIG. 5 illustrates aspects of multi-band CA communications that can be used with mmW receivers with spur suppression, according to aspects described herein.

FIG. 5 illustrates aspects of multi-band CA communications that can be used with mmW receivers with spur suppression in accordance with aspects described herein. FIG. 5 shows a graph 500 with a horizontal frequency axis 502 and a vertical power axis 501. The graph includes a power spike associated with a low frequency (LF) LO signal 510, and an LF signal 512. The LF LO signal 510 can, for example, be generated by LO 410 of FIG. 4, with the LF signal 512 being an RF signal input at RF input 490. In a single carrier system, if the LF signal 512 is to be down converted without other signals, there may not be spur issues with the path 400. However, in some CA combinations, as illustrated, a harmonic of the LF LO signal 510 (illustrated as LF LO spur 514) can occur within the band of another CA signal. As shown a second LO signal for a higher frequency channel, HF LO signal 520 is present, along with a corresponding HF signal 522. Each of these may correspond to a second path similar to the path 400 of FIG. 4. As discussed above, LF LO spur 514 can be a harmonic (e.g., twice the frequency) of the LF LO signal 510, that is propagated through packaging, power fan outs, or other parasitic paths, to allow one path for a first channel to interfere in the communication band of a second channel (e.g., with the LF LO spur 514 causing a noise spike that interferes with the HF signal 522). While FIG. 5 describes two CA signals, it will be appreciated that two non-CA signals of different frequencies may encounter the problem described above. Further, certain MIMO implementations (which utilize several signals having a single frequency) may encounter problems with spurs, for example due to an LO from one path coupling to another path through any of the elements noted above, and such couplings may experience different spurs due to varying impedances in the different paths and/or elements. In some implementations, multiple signals can be processed together by a device. For example, two RF signals may be downconverted and then combined (e.g., as a merged IF or baseband signal, for example such that the merged signal can be communicated over a common line, cable, or path) that is processed together by ADC circuitry.

Figure 6:
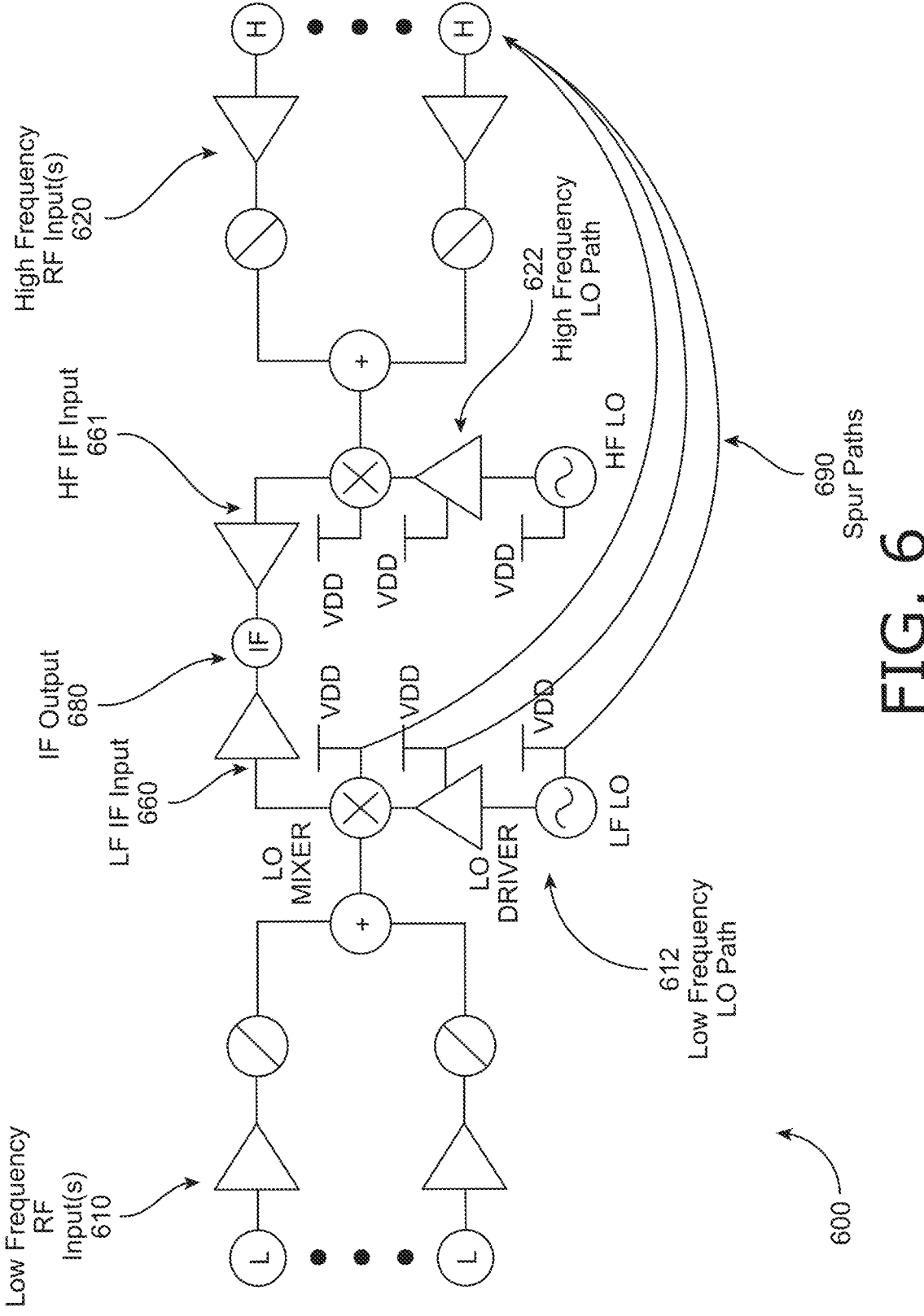
FIG. 6 illustrates aspects of a receiver that can be implemented with spur suppression for mmW communications, according to aspects described herein.

FIG. 6 illustrates aspects of a receiver 600 that can be implemented with spur suppression for mmW communications in accordance with aspects described herein. The receiver 600 is an example of the (e.g., multi-channel) receiver system discussed above, where spur paths 690 (e.g., parasitic paths through a device) can propagate a signal from the LO generation and receive path for one channel, into the receive path for a different channel, causing in-band interference and noise as illustrated in FIG. 5. The arrows terminating the spur paths 690 are examples only as the spurs may be injected at any number of locations along the HF (LO and/or signal) path. As indicated above, LF LO signal 510 corresponds to LF signal 512, while HF LO signal 520 corresponds to HF signal 522. LF LO spur 514 is harmonically related to LF LO signal 510. Examples are provided herein of an LF path interfering with an HF path, but in certain other implementations an HF path may interfere with an LF path or a path may interfere with another path of similar frequency.

The receiver 600 of FIG. 6 includes two LO paths (e.g., similar to path 400), including a low frequency (LF) LO path 612 and a high frequency (HF) LO path 622. The LF LO path 612 is configured to and may generate an LF LO signal, such as the LF LO signal 510, that is to be mixed with signals from one or more LF RF inputs 610. For instance, the LF RF inputs 610 may provide an LF signal, such as the LF signal 512. The signal from the one or more LF RF inputs 610 (where the encircled Ls may represent antenna ports or antennas, for example the antenna 230 or 280, which may be arranged in an array, for example a phased array) is mixed with the LO signal from the LF LO path 612 to generate an LF IF signal at LF IF input 660. A high frequency (HF) path is also present, with one or more HF data inputs 620 (where the encircled Hs may represent antenna ports or antennas, for example the antenna 230 or 280, which may be arranged in an array, for example a phased array) and a HF LO path 622. The HF data inputs 620 may provide a HF signal, such as the HF signal 522. The HF LO path 622 is configured to and can generate a HF LO signal, such as the HF LO signal 520. The signal from the one or more HF data inputs 620 is mixed with the HF LO signal from the HF LO path 622 to generate a HF intermediate frequency (IF) signal at the HF IF input 661. The LF IF signal and the HF IF signal are added (or otherwise merged into a single IF signal that includes the LF IF and the HF IF) together at the IF output 680, and a single merged IF signal can then be sent to additional circuitry to be digitized and converted to a signal that can be processed as normal data by a device (e.g., processed and output by a modem).

For example, in some aspects, the receiver 600 can be implemented as part of a radio frequency integrated circuit (RFIC) in a device that includes the RFIC. In some aspects, the receiver 600 is implemented in a single integrated circuit. In other aspects, the receiver 600 can be packaged together in a module. In some such aspects the module or the RFIC can be connected to an intermediate frequency IC (IFIC) via a cable. In some aspects, an RFIC including the receiver 600 can be coupled to additional transceiver circuitry via a cable or other such connection. In various aspects, the elements of the receiver 600 can be included in devices such as the wireless transceiver 222, the wireless transceiver 272, and/or any communication device described herein.

The IF implementation above is one example, and in other aspects, other implementations without the IF can be used. For example, in some aspects, direct conversion can be used such that the signals are downconverted to baseband or near baseband and then those signals are processed (e.g., managed using multiplexing circuitry and analog-digital conversion circuitry) at frequencies at or near the baseband frequency.

In various aspects, paths to communicate data from an RFIC to other aspects of a communication apparatus can be costly in terms of space, power usage, signal quality, and component cost. In some aspects, a transmission line that couples an RFIC including the receiver 600 can be many multiples of the wavelength of the signals transmitted on the lines (e.g., 10 centimeters (cm), 15 cm, 20 cm, etc.) Such costs are multiplied for CA communications with multiple IF data signals (e.g., one IF data signal for each carrier). By merging HF and LF signals to half the number of transmission lines (e.g., one for each CA pair of antennas instead of one for each antenna), the number of transmission paths and associated costs (e.g., space, power, etc.) may halved or otherwise reduced.

As illustrated, spur paths 690 (e.g., associated with power fan out paths or other parasitic package paths) can generate a noise signal from the receive path for one channel that interferes with the signal in another channel (e.g., the LF LO spur 514 interfering with the HF signal 522).

The illustrated example of FIG. 6 shows a spur from a lower frequency LO path interfering with a higher frequency channel. In other implementations, a higher frequency channel can have a spur that interferes with a lower frequency channel. FIG. 6 shows two channels, but a device such as a cell phone may have more channels (e.g., 5 frequencies operating with two polarization for 10 receiver paths active at the same time), and a home internet array may have even more active channels (e.g., 32, 64, 128, or more active receive paths operating at the same time). In such situations, the number of possible spurs from one path impacting another active path increases as the number of active receive paths increase. As described above, different combinations of frequencies can be used under different operating conditions (e.g., as managed by a codebook and AGC management block 350, CA block 340, etc.). If a spur is sufficiently strong, the entire channel or signal on a certain receive path for a given combination may be unusable, significantly degrading performance of a device. For example, a system may have a limit of −110 dBm noise for CA channel usage. If a spur propagates noise higher than this threshold through a system, the additional channel noise or other system noise can guarantee that a channel associated with a spur for a device and operating condition may never be usable.

Figure 7:
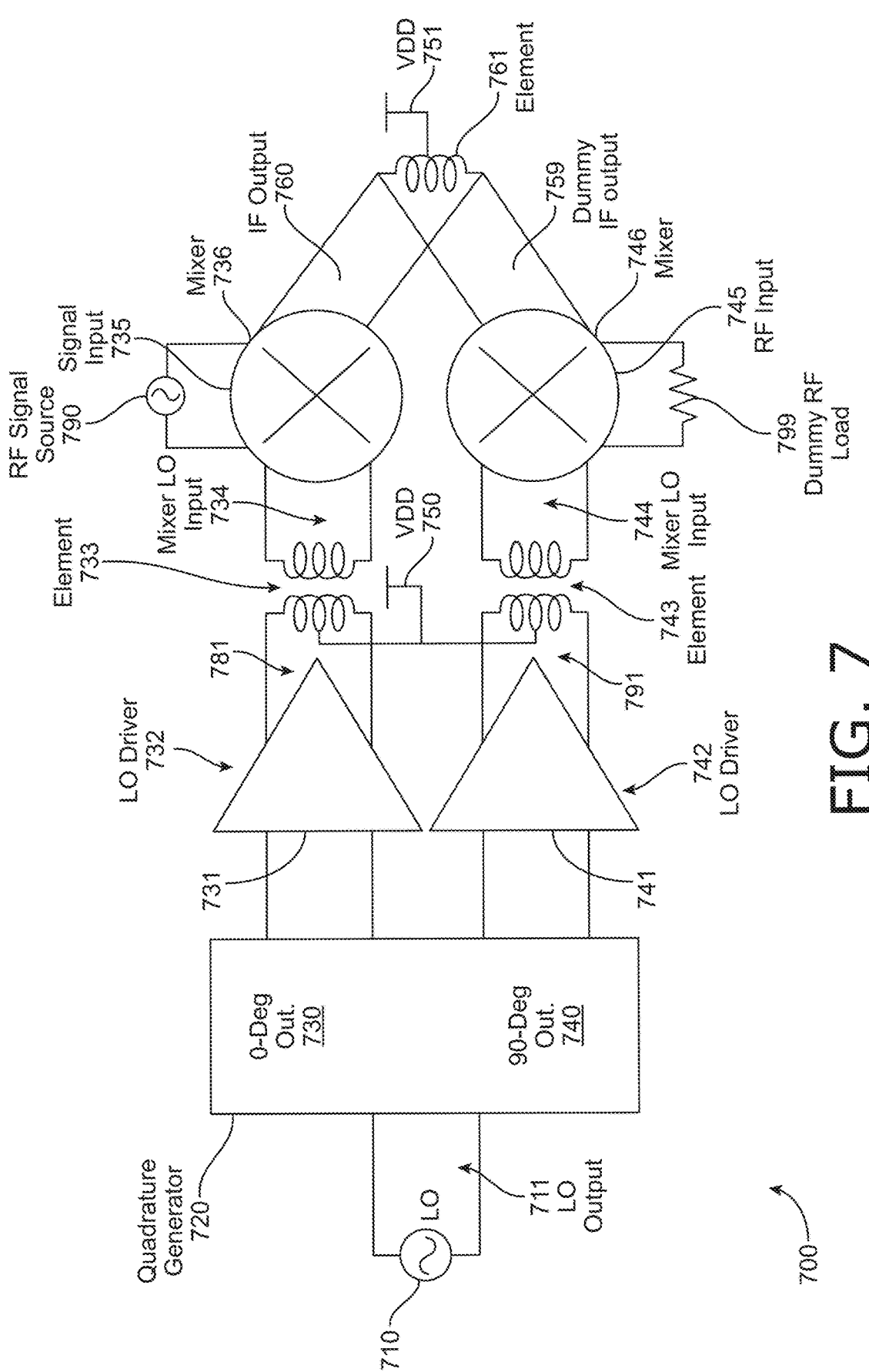
FIG. 7 illustrates aspects of an LO path, mixing system, and intermediate frequency (IF) output with spur suppression that can be used with mmW communications, according to aspects described herein.

FIG. 7 illustrates aspects of an apparatus 700 including an LO path with a mixing system and intermediate frequency (IF) output with spur suppression that can be used with mmW communications in accordance with aspects described herein. Aspects described herein leverage quadrature signals (e.g., signals 90 degrees out of phase) that, when squared, result in signals that are 180 degrees out of phase. As described above, spurs in an LO generation path can result from second order harmonics that occur from active elements in the LO path. The apparatus 700 can be used in place of an LO path described above, when the particular LO is known to have a second order harmonic that interferes with another channel in certain channel combinations. For example, the apparatus 700 can be an implementation of the low frequency LO path 612, with the low frequency RF input(s) 610 operating as the RF signal source 790.

The apparatus 700 includes a local oscillator (LO) 710 having an LO output 711 for an LO signal. The apparatus 700 includes a quadrature generator 720 (e.g., a quadrature generation circuit) having an input coupled to the LO output 711, a first output for a first LO signal (e.g., a 0-degree output 730), and a second output for a second LO signal (e.g., a 90-degree output 740 for a suppression LO signal), where the second LO signal is 90 degrees out of phase with the first LO signal.

The apparatus 700 includes a first LO driver 732 having a first LO output 781 and a first LO input 731, wherein the first LO input 731 of the first LO driver 732 is coupled to the first output 730 of the quadrature generator 720 (e.g., the 0-degree output 730). The apparatus 700 includes a second LO driver 742 having a second LO output 791 and a second LO input 741, where the second LO input 741 is coupled to the second output 740 (e.g., the 90-degree output). The apparatus 700 includes a first power connection VDD 750 coupled to the first LO output 781 (e.g., via an inductive element 733) and the second LO output 791 (e.g., via an inductive element 743). In other implementations, other elements (e.g., capacitive, or complex networks) can be used. Spurs that could propagate through VDD 750 are suppressed due to a phase difference between the first LO signal and the second LO signal (e.g., due to the second harmonic spurs output from LO drivers 732 and 742 being 180 degrees out of phase at the shared connection to the power connection 750) when the LO outputs are 90 degrees out of phase). The second harmonic spurs being 180 degrees out of phase results in the spurs suppressing each other where they combine at the connection VDD 750, preventing the second harmonic spurs from propagating through the power network as noise that can impact performance.

The apparatus 700 includes a first mixer 736 having a first mixer LO input 734, a first mixer radio frequency (RF) signal input 735, and a first mixer IF output 760, where the first mixer LO input 734 is coupled to the first LO output 781 (e.g., via the inductive element 733), and where the first mixer RF signal input 735 is coupled to an RF signal source 790 (e.g., one or more antennas receiving wireless RF signals). The apparatus 700 also includes a second mixer 746 having a second mixer LO input 744, a second mixer RF input 745 coupled to a dummy RF load 799. and a second mixer IF output 759 for outputting a dummy IF signal with a spur 180 degrees out of phase with a spur of the IF signal at IF output 760. The second mixer LO input 744 is coupled to the second LO output 791 (e.g., via the inductive element 743), and the second mixer RF input 745 is coupled to the dummy RF load 799. In some aspects, the dummy RF load 799 is a resistor approximately matched to an input resistance associated with the RF source 790. In some aspects, the dummy RF load 799 is a more complex network of elements, some or all of which can be programmable. For example, one aspect can include the dummy RF load 799 as a programmable resistor, while another aspect can include a network of multiple elements, including fixed and programmable capacitors and resistors as the dummy RF load 799.

In some implementations, the LO driver 742 and/or the mixer 746 are programmable, adjustable, or otherwise scalable to match spur suppression against power dissipation.

Such programming can generate a second harmonic spur (e.g., in the lower path including the LO driver 742 and the mixer 746) 180 degrees out of phase with the second harmonic spur of the primary signal (e.g., in the upper path including the LO driver 732 and the mixer 736), but with a lower amplitude, so that the amount of suppression provided is scaled based on operating characteristics. Such scaling can be designed to allow a limited amount of second harmonic propagation as noise through the power system. A design can thus identify a threshold tolerable amount of second harmonic noise that can be tolerated by a system, and a lower power suppression signal can be used to achieve less than the threshold amount of second harmonic noise, rather than using additional power to minimize or eliminate the second harmonic noise.

The apparatus 700 includes a second power connection VDD 751 coupled to the first mixer IF output 760 and the second mixer IF output 759. Just as for the combined signal at the connection VDD 750, the IF outputs 759 and 760 combine to provide spur suppression of second order harmonics. The suppression is associated with the phase difference between the first LO signal and the second LO signal (e.g., such that a spur in the dummy IF signal at IF output 759 is 180 degrees out of phase with a spur in the IF signal at IF output 760, causing suppression of the second order harmonics and suppressing the second order harmonic signal that could otherwise propagate through the power network and impact device performance).

The LO 710 signal generator outputs an LO signal at a given frequency that can be used to downconvert a given RF signal associated with a carrier in a mmW CA receiver or in another type of receiver as described herein. The quadrature generator 720 takes the LO signal from the LO 710 and generates two LO outputs at the same LO frequency that are 90 degrees out of phase. The 0-degree output 730 is part of the main path and the 90 degree output 740 is part of a "dummy" path that can be turned off using control and/or switching circuitry (not shown), when the device including the apparatus 700 is operating in a mode where the $2^{nd}$ order harmonic does not cause issues with performance, and turned on when suppression of the $2^{nd}$ order harmonic is used to meet acceptable performance to allow use of another channel in a given (e.g., CA) operation state.

The 0-degree output 730 is coupled to LO driver 732, which amplifies the LO signal, creating a $2^{nd}$ order harmonic that is also at a 0-degree phase shift. When the dummy path is turned off, the $2^{nd}$ order harmonic can be propagated as a noise signal through the VDD power connection 750. When the dummy path is turned on, the 90-degree signal from 90-degree output 740 is amplified at LO driver 742. The 2nd order harmonic output from the LO driver 742 is 180 degrees out of phase from the 2nd order harmonic output from the LO driver 732. When the LO signals output from the LO driver 732 and the LO driver 742 pass through corresponding elements 733 and 743 and are coupled at the shared VDD power connection 750, the 2nd order harmonics of the LO signal are 180 degrees out of phase and suppress each other. Similarly, any 2nd order harmonics created by mixers 736 and 746 will be 180 degrees out of phase at the shared VDD 751 connection via element 761 and will cancel each other out. The element 761 can be an inductor or a network of elements that facilitate coupling of power from a power network to devices in a system while limiting noise transfer within a system via the power connections. In some implementations, the element 761 can be a transformer or part of a balun to convert a signal propagated through the power network. The dummy RF load 799 can be designed to avoid signal imbalances or to meet any performance criteria (e.g., matching an impedance associated with signal input 735). In both the cases where the dummy path (e.g., the 90 degree output 740, the LO driver 742, and/or mixer 746) is off and on, the downconverted IF signal from mixing the LO signal and the received RF signal(s) at mixer 736 is output at IF output 760 and provided to an IF output that is connected to additional circuitry (circuitry and connection to provide the IF signal to the additional circuitry not shown). The signal can then be further downconverted to baseband or near baseband to digitize the data signal for processing within a modem (e.g., IF output 680 along with any associated IF amplifier such as an amplifier configured to receive LF IF input 660 or HF IF input 661). As indicated above, the IF structure discussed herein is one possible implementation. Other implementations can convert data signals directly from RF to baseband or near baseband frequencies, using structures similar to the IF structures described herein.

The apparatus 700 illustrates a controllable architecture for suppression of 2nd order LO harmonics. It will be apparent that corresponding suppression circuitry for third or fourth harmonics (or other spurs) of an LO can be added with additional circuitry for generating the appropriate phasing signals for the waveforms to be suppressed using an extension of the aspects described above. Such extensions can be switchable as described above so that the suppression is implemented when suppression provides target device performance.

For example, in some aspects, the apparatus 700 may include additional paths with additional LO drivers and mixers with dummy RF loads. Such additional paths can include power connections similar to the connections at shared VDD 750 and shared VDD 751 to provide suppression of additional harmonics or spurs. For example, as described above, the LF LO signal 510 generates an LF LO spur 514 (e.g., a second order harmonic). In some systems, third harmonics or fourth harmonics of the LF LO signal 510 may additionally interfere with other (e.g., CA) channels. In such designs, the additional connections or paths can be configured to target suppression of such third and fourth harmonic spur signals. For example, in one implementation, an apparatus similar to the apparatus 700 may include an LO source having an LO output for an LO signal. In place of the quadrature generator 720, other splitter phase generation circuitry may be used having an input coupled to the LO output, and a plurality of outputs, with the plurality of outputs including at least a first output for a first LO signal, and a second output for a second LO signal, wherein each output of the plurality of outputs other than the first output is configured with a signal out of phase with the first LO signal. Again, similar to the apparatus 700, but with additional paths for spur suppression, such aspects may include a plurality of LO drivers, each LO driver of the plurality of LO drivers comprising a corresponding LO driver input coupled to a corresponding output of the plurality of outputs of the splitter phase shifting circuitry. Power connections coupled between groupings of outputs of the plurality of LO drivers provide spur suppression associated with a phase difference between the outputs of the plurality of LO drivers in an associated grouping, similar to the suppression of the apparatus 700, but with additional signal paths and connections for suppression of additional (harmonic) signals. As described above, the illustrated suppression circuitry can be used in a receive path of a mmW CA communication device and/or mmW device implementing (multi-frequency) communications other than CA. Such devices can, in some implementations include wireless signals operating at frequencies between 37 gigahertz (GHz) and 43.5 GHz (which may be an example of the HF recited above), between frequencies at 24 GHz and 29.5 GHz (which may be an example of the LF recited above), or at any other such suitable frequencies for mmW (or higher) communications.

As illustrated, the apparatus 700 includes generation of the quadrature (e.g., 90) degree out of phase) signals using a quadrature generator 720. Such circuitry can be any quadrature generation circuitry suitable for the appropriate mmW compatible LO frequency matching the output from the LO 710. In other implementations, such as when additional filtering is used or additional complexity may provide additional suppression, an alternative element for generating the quadrature signals (e.g., or other signals for suppression of other harmonics or spurs) may be used. For example, in some implementations, a polyphase filter can be used to create the quadrature signals with less space usage than a typical quadrature generation circuit. In other implementations, other such circuits such as a branchline coupler, a polyphase filter quadrature splitter, a Lange coupler or other such circuitry can be used. A single device can include different such circuitry, dependent on the amount of suppression to meet noise or other performance criteria. For example, in some implementations, a dummy path may be configured to be always on, when the suppression is always used. In such an implementation, where control and switching are not present to turn off the dummy path, different elements may be used (e.g., different quadrature generation circuitry).

The apparatus 700 provides noise improvements in mmW receivers not available in other devices for spur suppression and/or can achieve spur suppression with less resource usage (e.g., space, power, etc.) within a device architecture. For example, while certain types of noise are cancellable within a modem after a receive signal is digitized, the complexity and combinations of channels in mmW CA receiver operations may make suppression of such spurs within modem processing overly complex or infeasible. Similarly, while additional isolation, modification of CA frequency layouts, or other design options can be used to suppress spurs or result in spurs being out-of-band based on physical location of an LO path relative to other LO paths in a CA system, with multiple paths (e.g., 5, 10, 32, etc.), the complexity of modifying a layout to address such parasitic noise paths can become overly complicated and can result in other unintended negative impacts on a design. The apparatus 700 can be used in a design once spurs from one channel that are aggressing (e.g., causing noise issues) in another channel are identified with relatively small added space and power usage. Additionally, the layout of the dummy path can be tailored to the amount of suppression to achieve performance targets, such that mismatches between the dummy path and the primarily LO path can be designed with greater or lesser accuracy and space usage dependent on the amount of suppression needed (e.g., where a greater mismatch can be tolerated if less suppression achieves performance targets).

As described above, the apparatus 700 can be used in design of circuit which is initially designed for a mmW CA receiver, but where the LO signal for one channel is identified as generating aggressor noise in another channel. The LO path in such a design can be replaced with an apparatus 700 to suppress the noise spurs in any number of LO paths in such a mmW CA receiver design. In the new replacement LO path, as illustrated, the LO signal is input to quadrature generation circuitry that outputs two LO signals, one with a reference phase (e.g., the upper signal) and another offset from the upper signal by 90 degrees. When the signals are amplified by the corresponding LO drivers, the phase difference of the 2nd order harmonic generated by the drivers are 180 degrees out of phase with each other. The connection tying the two LO signals together at a first power connection will cause the 2nd order harmonics, which are 180 degrees out of phase, to cancel each other out, suppressing the 2nd order LO spur from the LO driver that would otherwise propagate to other devices via package and power connections. 2nd order harmonics generated by two mixers in the replacement LO path will similarly be 180 degrees out of phase at the mixer outputs and will cancel each other out at the shared connection to a second power path. The IF output from the first mixer will be passed to the IF path, and the dummy RF load input to a second mixer provides balance to the system. The quality (e.g., and real-estate usage within a design) can be varied based on the match that produces a given level of performance. In some aspects, the match can be within five percent, in other aspects, the match can be within ten percent, two percent, or any other such error margin selected to produce acceptable communication performance.

Figure 8A:
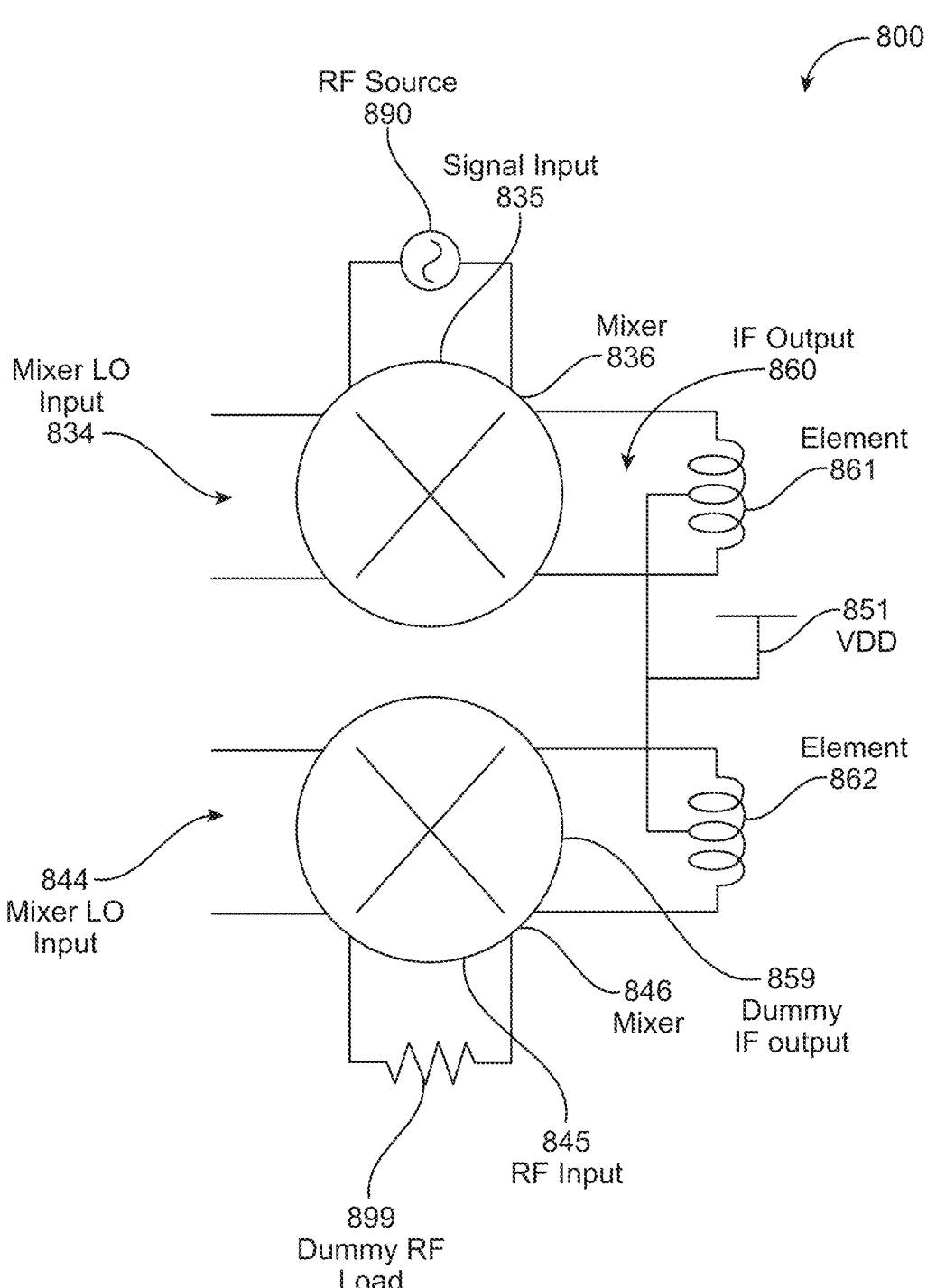
FIG. 8A illustrates aspects of an alternative mixing system and intermediate frequency (IF) output for spur suppression that can be used with mmW communications, according to aspects described herein.

During operational environments where the 2nd harmonic of the LO in the illustrated chain will not interfere with another carrier (e.g., when the HF signal 522 of FIG. 5 is not in use and the LO is generating the LF LO signal 510), the second LO driver and the second mixer can be switched off to save power, with limited impact on performance (e.g., the performance of the low frequency LO path 612 with a dummy LO path of the apparatus 700 turned off when the low frequency LO path is implemented as an implementation of the apparatus 700). Variations of the above device can include an implementation where the inductive element between the two mixers at second power connection is split into two inductive elements, as illustrated in FIG. 8A below. The use of two elements instead of one results in increased space usage, but greater layout flexibility.

FIG. 8A illustrates aspects of an alternative mixing system and intermediate frequency (IF) output for spur suppression that can be used with mmW communications in accordance with aspects described herein. The circuitry 800 of FIG. 8A replaces similar circuitry in the apparatus 700 of FIG. 7 to provide additional layout flexibility in the space used by the connection of the IF signals to a power connection used to suppress (harmonic) spurs in the IF signals.

The circuitry 800 includes mixer 836 and mixer 846. The mixer 836 has an LO input 834, an RF signal input 835, and an IF output 860 (e.g., similar to the mixer 736 of FIG. 7). The mixer 846 has an LO input 844, an RF signal input 845, and an IF output 859 (e.g., similar to the mixer 746 of FIG. 7). Just as in FIG. 7, the corresponding mixer 836 is configured to receive an RX RF signal from an RF source 890 (e.g., one or more antennas configured to receive mmW wireless communications), and the mixer 846 is coupled to a dummy RF load 899 configured to balance the circuit 800. In circuitry 800 however, rather than a single inductive element used to couple the two IF signals output from the mixers to a power connection (e.g., as illustrated by element 761 and the power connection VDD 751 of FIG. 7), two elements 861 and 862 are used. In some implementations, a single element 761 as shown in FIG. 7 may use a significant amount of space in a design. By using two separate elements 861 and 862 which provide electrically equivalent paths to the power connection VDD 851, the relative phase between the IF signals output from the mixer 836 and the mixer 846 can be maintained, while allowing design flexibility with two smaller inductive elements 861 and 862 which can be placed flexibly at different positions within a layout. The IF signal output from mixer 836 containing the (harmonic) spur that would cause noise in a design not having mixer 846 is suppressed at the power connection VDD 851, as the dummy IF signal from mixer 846 (e.g., generated with an LO signal 90 degrees out of phase from the LO signal input to mixer 836) has a spur at approximately the same (harmonic) frequency and with approximately the same amplitude that is 180 degrees out of phase with the spur in the IF signal from the IF output 860. Given a sufficient match between the dummy RF load 899 and the impedance of the RF source 890, along with balance between other elements of the main LO and IF path (e.g., which includes element 861 in circuitry 800 of FIG. 8A) and the dummy LO and IF path (e.g., which includes element 862 in circuitry 800 of FIG. 8A), the spurs in the two IF signals will cause sufficient suppression of the spur to meet receiver performance criteria.

Figure 8B:
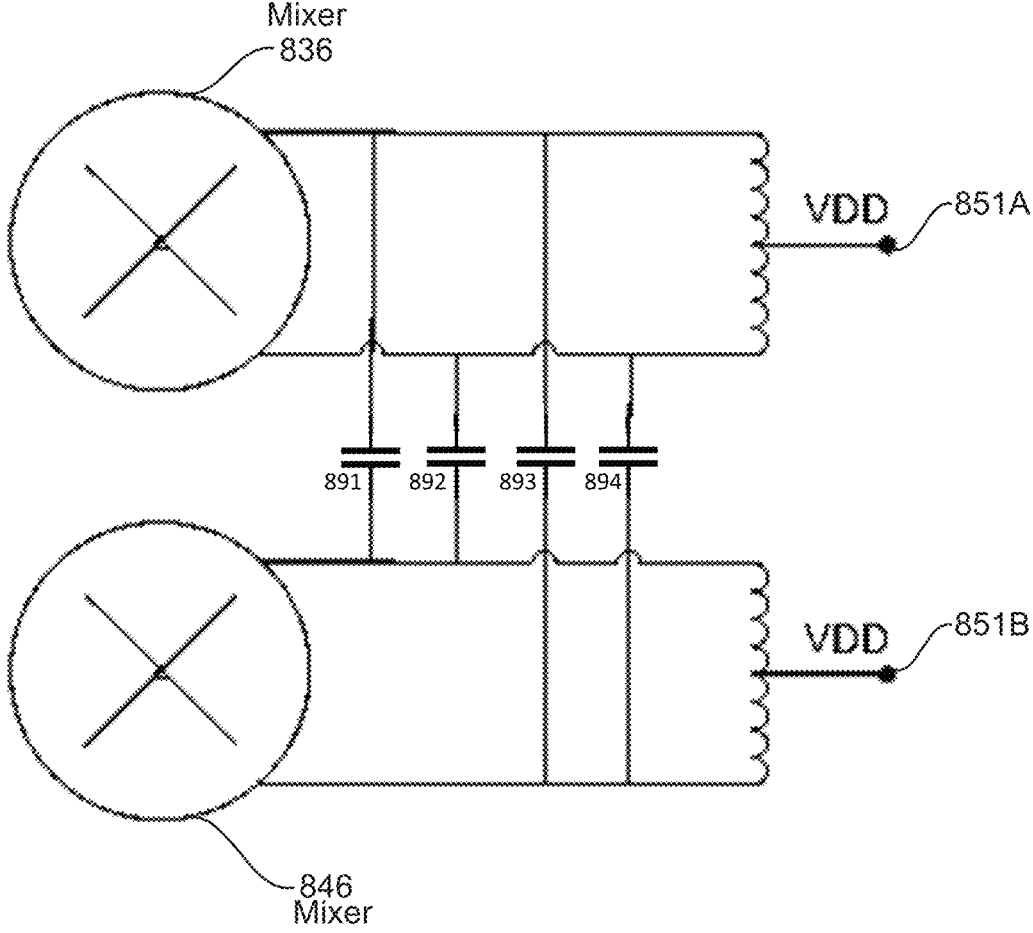
FIG. 8B illustrates aspects of capacitive coupling in an alternative mixing system and intermediate frequency (IF) output for spur suppression that can be used with mmW communications, according to aspects described herein.

FIG. 8B illustrates aspects of capacitive coupling in alternative mixing system and intermediate frequency (IF) output for spur suppression that can be used with mmW communications, according to aspects described herein. Just as above in FIG. 8A, the elements of FIG. 8B replaces similar circuitry in the apparatus 700 of FIG. 7. In FIG. 8B, capacitive coupling is additionally used for loading the differential mode of the LO signal for suppressing elements of the LO signal that can be propagated through the power supply network to other parts of a system. Just as described above, the circuitry of FIG. 8B includes mixer 836 and mixer 846. The output connection to VDD from the mixer 836 at VDD 851A includes a signal with a reference phase, as the output connection to VDD from the mixer 846 at VDD 852B (e.g., where 851A and 852B connect to a shared VDD node of the power supply network) is phase shifted, with a second order harmonic at VDD 852B 180 degrees out of phase from the second order harmonic at VDD 851A. The capacitors 891, 892, 893, and 894 couple each combination of the differential output of the mixer 836 and the differential output of the mixer 846, with a balun at the connection to VDD to convert the differential signal to a single-ended power signal in the power supply network (e.g., at VDD 851A and VDD 851B). The capacitors 891, 892, 893, and 894 provide LO signal suppression with no loading from the mixers 836 and 846, but some additional loading from parasitics between the capacitors 891, 892, 893, and 894. The capacitors 891, 892, 893, and 894 can thus provide additional suppression to prevent LO signals from propagating through the power supply network (e.g., via VDD 851A and 852B). The example of FIG. 8B illustrates the use of coupling capacitors at the shared power connection for the mixer outputs. Similar use of coupling capacitors can be used at the outputs of the LO drivers (e.g., at the VDD 750 connection for the LO drivers 732 and 742) to suppress propagation of LO signals (e.g., the second order LO harmonics).

FIGS. 9A, 9B, 9C, and 9D illustrate examples of RX paths. Each of the RX paths in FIGS. 9A through 9D can be examples of the low frequency LO path 612, where spur paths (e.g., the spur paths 690) can propagate second harmonics through the power supply network to interfere with operation of a higher frequency band in CA operation.

Figure 9A:
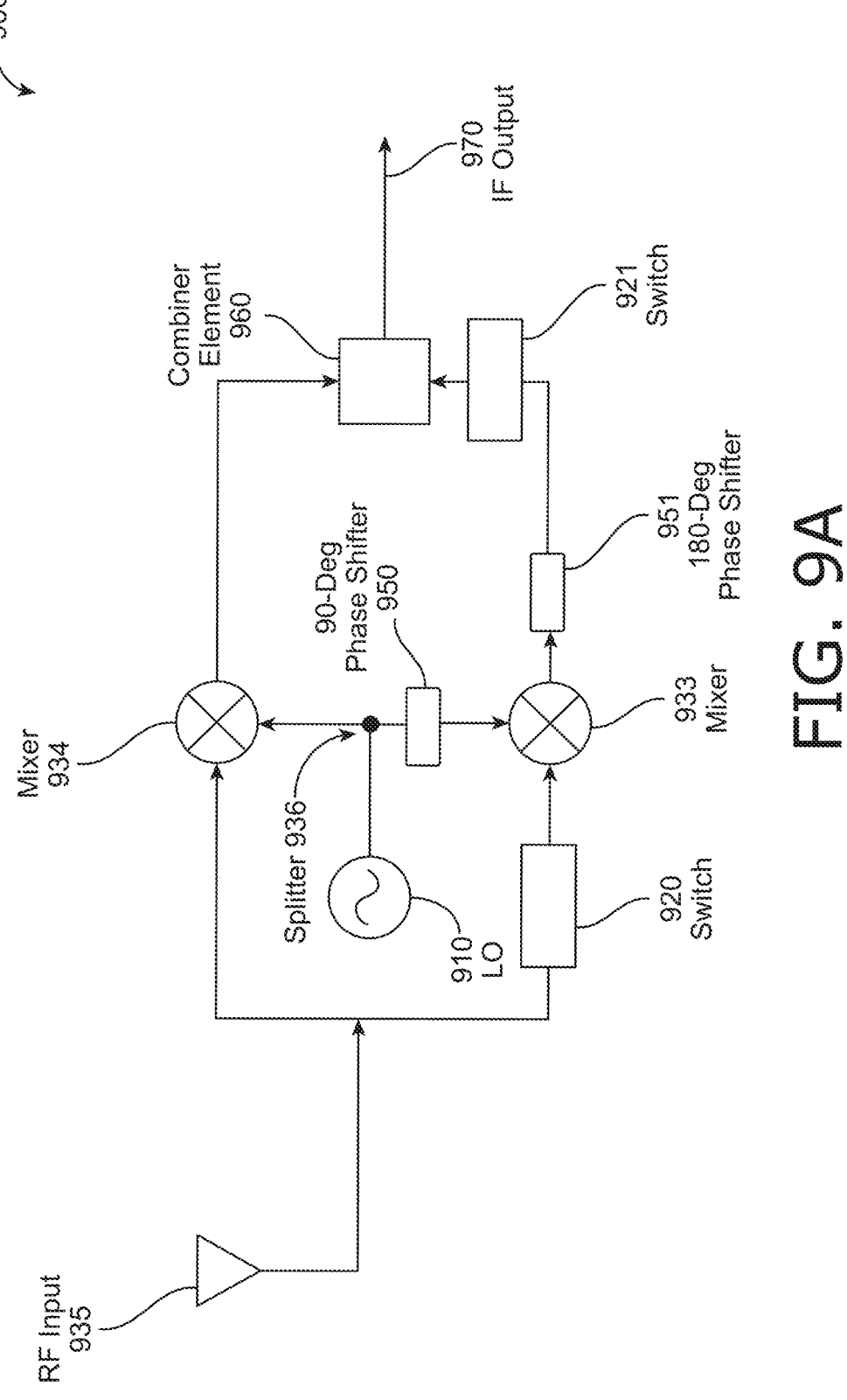
FIG. 9A illustrates an additional implementation of an RX path with spur suppression that can be used for mmW communications, according to aspects described herein.

FIG. 9A illustrates an additional implementation of an RX path 900 with spur suppression that can be used for mmW communications in accordance with aspects described herein. The RX path 900 includes RF input 935 (e.g., from one or more receiver antennas), a splitter 932, an LO generator 910, mixer 934, mixer 933, a 90-degree phase shifter 950, a 180-degree phase shifter 951, combiner element 960, and an IF output 970. While not explicitly illustrated, one or more (e.g., all, or all but the IF output 970 in some configurations) of the signals in FIG. 9A may be differential. Similarly, one or more of the signals may be single-ended.

Just as above, the local oscillator (LO) generator 910 generates an LO signal for use in downconverting wireless mmW signals received via the RF input 935. The splitter 932 is coupled to the LO generator 910, and the splitter provides two LO signals as outputs, which include a first LO signal from a first output and a second LO signal from a second output. The 90-degree phase shifter 950 has an output, and an input coupled to the second output of the splitter to receive one of the LO signals and create an LO signal 90 degrees out of phase with the other LO signal.

The first mixer 934 has an output, a first input coupled to the RF input 935, and a second input coupled to the first output of the splitter 932. The second mixer 933 has an output, a first input coupled to the RF input 935, and a second input coupled to the output of the 90-degree phase shifter 951. The 180-degree phase shifter 951 has an output, and an input coupled to the output of the second mixer 933. The combiner element 960 has an intermediate frequency (IF) output 970, a first input coupled to the output of the first mixer 934, and a second input coupled to the output of the 180-degree phase shifter 951.

In some implementations, the RX path 900 can be implemented without switches 920 and 921, when the suppression circuitry is configured to be on all the time. In the implementation of the RX path 900, switches 920 and 921 are included to allow for the suppression IF signal to be turned off in order to conserve power. The first switch 920 is coupled between the RF input 935 and the input of the second mixer 933. The second switch is coupled between the output of the 180-degree phase shifter 951 and the second input of the combiner element 960. By opening switches 920 and 921 when suppression is not needed, the LO and IF path can operate at near the performance of an LO and IF path without the suppression. When switches 920 and 921 are closed, additional power is used by the circuitry of path 900 to suppress harmonic spurs from mixer 934 that can interfere with other channels of a mmW receiver as described above. For example, control circuitry (e.g., control circuitry 320 along with any blocks of apparatus 300) can configured to close the first switch 920 and the second switch 921 when the mmW receiver is configured for a CA operation mode where a harmonic of an IF signal output from the first mixer 934 interferes with a second carrier of the CA operation mode (e.g., based on operating mode selection and information about carrier combinations for a given CA operating mode).

The circuitry of path 900 can be considered as similar to circuitry of an image rejection mixer with switches added to allow the phase shifted signal to be turned off for operating modes where the 2nd harmonic (or other spur, if modified appropriately) does not interfere with other carriers. Though not specifically illustrated, the same shared connections at power connections described above (e.g., power connections VDD 750, 751, 851, etc.) are used in path 900. The shared connection at such power connections provided from the outputs of the mixers and any LO drivers in implementations path 900 are used for spur suppression in accordance with the details provided above. Such an implementation involves additional complexity and power consumption beyond what is described in the implementations of FIGS. 7 and 8 (e.g., the addition of the two IF signals output from the two mixers which is not present in FIGS. 4 and 5). As a benefit, circuitry of path 900 can allow additional frequency rejections and filtering of the IF signal, in addition to the spur suppression described above, while also including an option to turn off the lower mixer 933 (e.g., and associated drivers) when the 2nd path operation is not needed to meet performance criteria associated with a given combination of frequencies.

In some implementations, such an image rejection mixer can be created from either implementation of FIG. 7 or 8 by replacing the dummy RF load with a 2nd RF input (e.g., from a split of the signal from the RF source 790 or the RF source 890), and adding a combiner element (e.g., similar to combiner element 960) at outputs of the two mixers to sum the two IF signals generated from the two mixers.

Figure 9B:
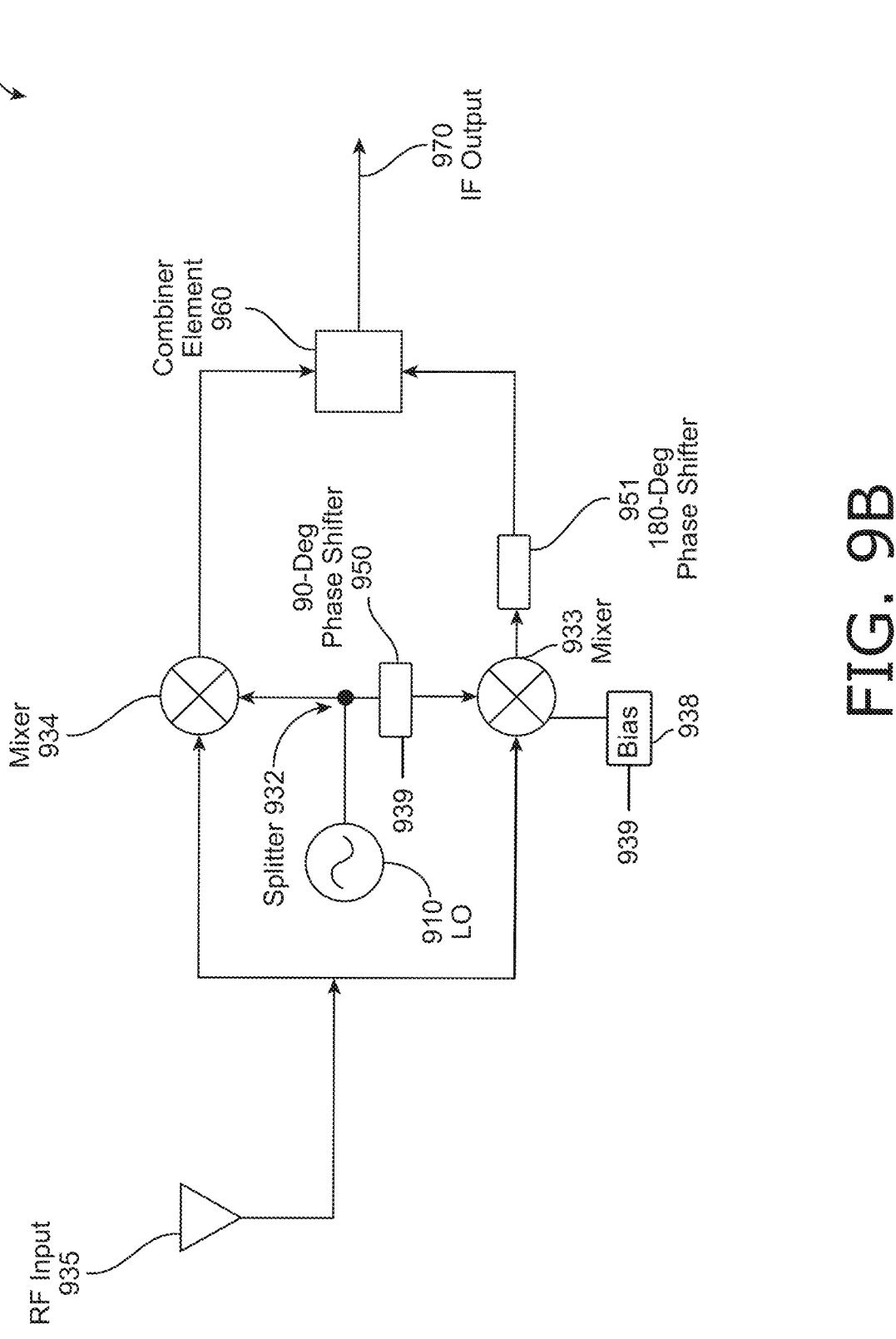
FIG. 9B illustrates an additional implementation of an RX path with spur suppression that can be used for mmW communications, according to aspects described herein.

FIG. 9B illustrates an additional implementation of an RX path 901 with spur suppression that can be used for mmW communications, according to aspects described herein. The RX path 901 operates in the same way as the RX path 900, but instead of using the switches of the RX path 900, the RX path 901 includes bias circuitry 938 controllable by a control signal 939 at an input to the bias circuitry 938. The control signal 939 at the input signals the bias circuitry 938 to selectively shut down the mixer 933. Similarly, the control signal 939 input to the 90 degree phase shifter 950 selectively shuts down the 90 degree phase shifter. When the control signal 939 shuts down the 90 degree phase shifter 950 and the mixer 933, the power used by these elements is limited, and the suppression associated with this lower path is turned off. The RX path 901 thus allows power saving, at the cost of control signaling elements used to shut-off the path used for suppression. Such a system can allow disable control without switching circuitry (e.g., that may degrade performance in the reference LO path) for CA modes that can operate within performance tolerances without har-monic suppression as described herein.

Figure 9C:
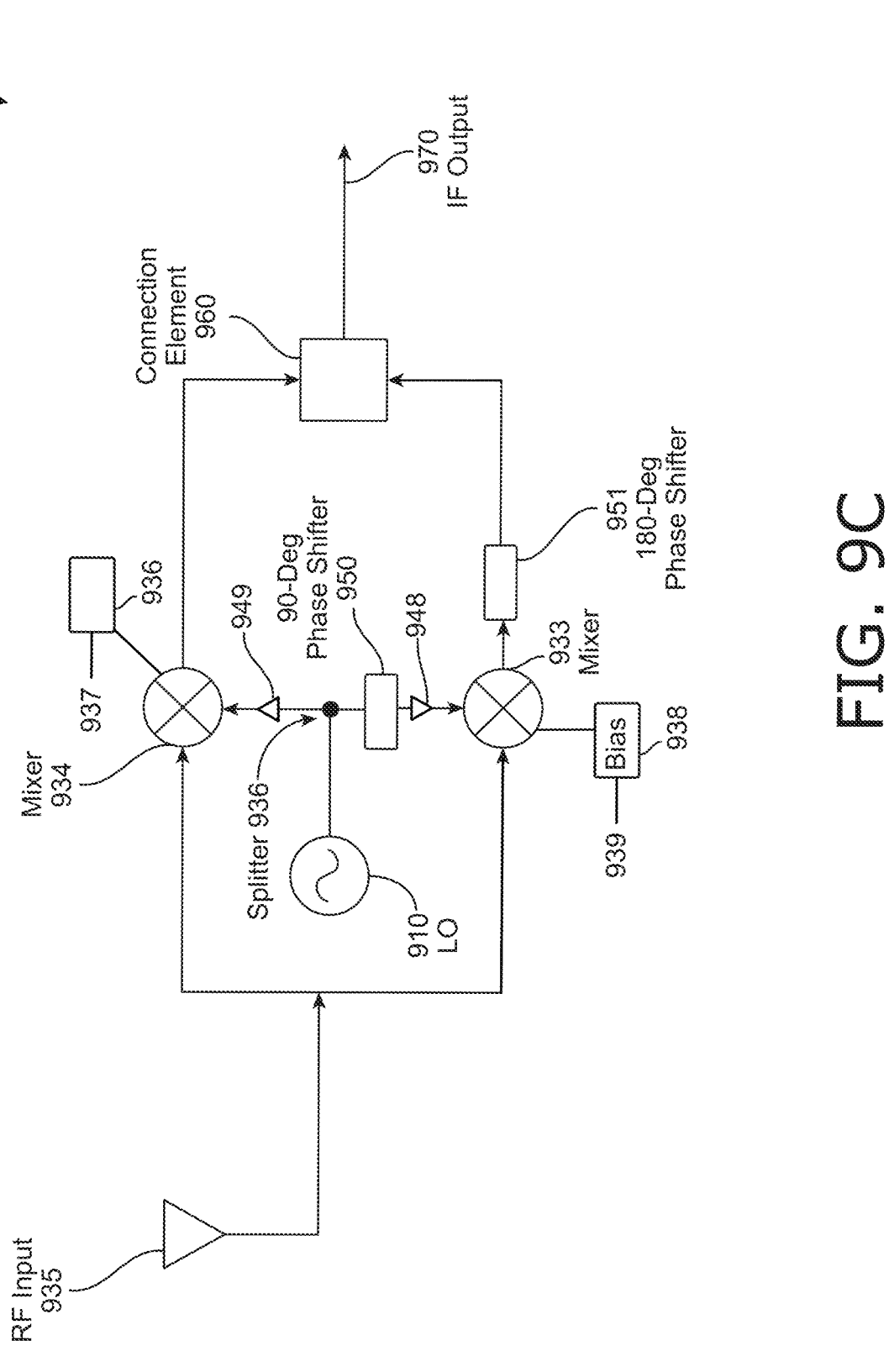
FIG. 9C illustrates an additional implementation of an RX path with spur suppression that can be used for mmW communications, according to aspects described herein.

FIG. 9C illustrates an additional implementation of an RX path 902 with spur suppression that can be used for mmW communications, according to aspects described herein. The RX path operates without switching and with the control signal 939 for the mixer 933, and also includes bias circuitry 936 with an independent control signal 937 for the mixer 934, and the LO inputs to the mixers 934 and 933 are selectively disconnected using circuits (e.g., switches or amplifiers or buffers that can be disabled) 948 and 949 to turn off the LO signals input to the mixers 934 and 933, rather than turning off the LO signal to the dummy path by turning off the 90 degree phase shifter using the control signal 939 as in the RX path 902. The RX path thus allows independent enable controls for the two LO paths, to allow some devices to use either LO path without the other path when second harmonic LO suppression is not needed, or both paths when second harmonic LO suppression is used to meet performance criteria.

Figure 9D:
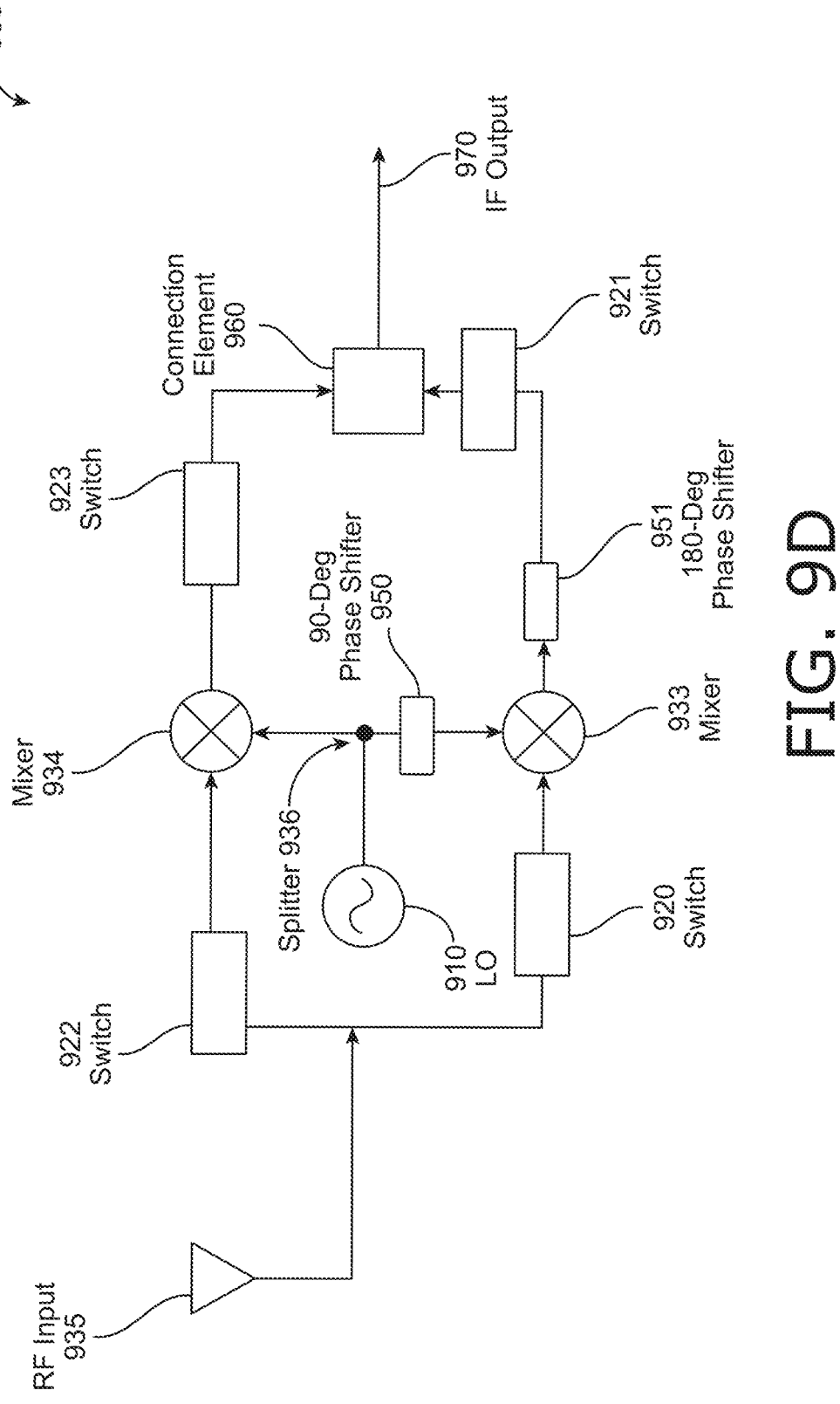
FIG. 9D illustrates an additional implementation of an RX path with spur suppression that can be used for mmW communications, according to aspects described herein.

FIG. 9D illustrates an additional implementation of an RX path 903 with spur suppression that can be used for mmW communications, according to aspects described herein. The RX path 903 uses switches similar to the RX path 900 of FIG. 9A but includes switches 922 and 923 in addition to the switches 920 and 921. The addition of the switches 922 and 923 can provide circuit matching benefits to avoid circuit mismatches and performance degradation associated with performance mismatches, particularly in image rejection operation. Just as described above, the switches 922 and 923 can be opened when harmonic suppression is not needed and path including the switches 922 and 923 is not being used, and the suppression signal can degrade performance rather than providing an enhancement. In other examples, the switches 922 and 923 are always closed during operation of the RX path 903 and only the path with the switches 920 and 921 is selectively disabled. The switches 920-923 may be controlled by and/or the control signals 939, 937 may be provided by the processor 208, 258, the modem 220, 270, the control circuitry 320, and/or control circuitry in the transceiver 222, 272.

FIG. 10 is a flow diagram describing an example of the operation of a method 1000 for operation of a wireless communication apparatus with a receiver having spur sup-pression for mmW functionality in accordance with aspects described herein. In some aspects, the described operations can be performed by a device including a memory and processing circuitry coupled to the memory and configured to perform the operations of the method 1000. In some aspects, the method 1000 can be embodied as instructions stored in a non-transitory computer readable storage medium that, when executed by processing circuitry (e.g., control circuitry) of a device, cause the device to perform the operations of method 1000 described below. The blocks in the method 1000 can be performed in or out of the order shown, and in some embodiments, can be performed at least in part in parallel.

Method 1000 includes block 1002, which involves gen-erating a first LO signal at a first millimeter wave (mmW) frequency.

Method 1000 includes block 1004, which involves gen-erating a second LO signal at the first mmW frequency, wherein the second LO signal is out of phase with the first LO signal.

Method 1000 includes block 1006, which involves gen-erating a harmonic of the first LO signal.

Method 1000 includes block 1008, which involves gen-erating a harmonic of the second LO signal such that the harmonic of the second LO signal is 180 degrees out of phase with the harmonic of the first LO signal with a matching amplitude.

In some aspects, such a method can further comprise communicating the first LO signal and the harmonic of the first LO signal to a first parasitic path associated with a second receiver path associated with a second carrier, and communicating the second LO signal and the harmonic of the second LO signal to the first parasitic path, such that the harmonic of the second LO signal suppresses the harmonic of the first LO signal, wherein the first LO signal is asso-ciated with a first carrier different than the second carrier. In some aspects, such a method can further comprise generat-ing the second LO signal by closing a first switch and a second switch using control circuitry based on a carrier aggregation (CA) operation mode where the harmonic of the first LO signal interferes with the second carrier of the CA operation mode.

The method 1000 can, in some implementations, further operate where the first LO signal and the second LO signal are generated using a quadrature generation circuit having an input coupled to an LO output of an LO generator, a first output for the first LO signal, and a second output for the second LO signal, wherein the second LO signal is 90 degrees out of phase with the first LO signal, where the harmonic of the first LO signal and the harmonic of the second LO signal are generated using a first LO driver having a first LO output and a first LO input, wherein the first LO input is coupled to the first output of the quadrature generation circuit, a second LO driver having a second LO output and a second LO input, wherein the second LO input is coupled to the second output of the quadrature generation circuit, a first mixer having a first mixer LO input, a first mixer radio frequency (RF) input, and a first mixer output, wherein the first mixer LO input is coupled to the first LO output, and wherein the first mixer RF input is coupled to an RF signal source, and a second mixer having a second mixer LO input, a second mixer RF input, and a second mixer output, wherein the second mixer LO input is coupled to the second LO output, and wherein the first mixer RF input is coupled to a dummy RF load. In some aspects, such an implementation may further operate where a first power connection is coupled to the first LO output and the second LO output to provide spur suppression associated with a phase difference between the first LO signal and the second LO signal and where a second power connection is coupled to the first mixer output and the second mixer output to provide spur suppression associated with the phase difference between the first LO signal and the second LO signal.

FIG. 11 is a functional block diagram of a wireless communication apparatus configured for spur suppression for mmW receivers in accordance with aspects described herein. The apparatus 1100 comprises means 1102 for means for generating a first LO signal at a first millimeter wave (mmW) frequency. The means 1102 can, for example, include the quadrature generator 720 or the LO generator 910. The apparatus 1100 further includes means 1104 for generating a second LO signal at the first mmW frequency, wherein the second LO signal is out of phase with the first LO signal. The means 1104 can, for example, include the quadrature generator 720 or the 90 degree phase shifter 950. The apparatus 1100 include means 1106 for generating a harmonic of the first LO signal. The means 1106 can include the mixer 736, the mixer 836, or the mixer 934. The apparatus 1100 further includes means 1108 for generating a harmonic of the second LO signal such that the harmonic of the second LO signal is 180 degrees out of phase with the harmonic of the first LO signal with a matching amplitude. The means described above can include combinations of elements described herein, including the mixer 746, the LO driver 742, the mixer 846, the mixer 933, and/or the 180 degree phase shifter 951.

The circuit architecture described herein described herein may be implemented on one or more ICs, analog ICs, mmWICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR) or corresponding mmW elements, (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1: a local oscillator (LO) source having an LO output for an LO signal: a quadrature generation circuit having an input coupled to the LO output, a first output for a first LO signal, and a second output for a second LO signal, wherein the second LO signal is 90 degrees out of phase with the first LO signal: a first LO driver having a first LO output and a first LO input, wherein the first LO input is coupled to the first output of the quadrature generation circuit: a second LO driver having a second LO output and a second LO input, wherein the second LO input is coupled to the second output of the quadrature generation circuit: a first power connection coupled to the first LO output and the second LO output: a first mixer having a first mixer LO input, a first mixer radio frequency (RF) input, and a first mixer output, wherein the first mixer LO input is coupled to the first LO output, and wherein the first mixer RF input is coupled to an RF signal source: a second mixer having a second mixer LO input, a second mixer RF input, and a second mixer output, wherein the second mixer LO input is coupled to the second LO output, and wherein the first mixer RF input is coupled to a dummy RF load; and a second power connection coupled to the first mixer output and the second mixer output.

Aspect 1A: A wireless communication apparatus, comprising: a local oscillator (LO) source having an LO output for an LO signal: a quadrature generation circuit having an input coupled to the LO output, a first output for a first LO signal, and a second output for a second LO signal, wherein the second LO signal is 90 degrees out of phase with the first LO signal: a first LO driver having a first LO output and a first LO input, wherein the first LO input is coupled to the first output of the quadrature generation circuit: a second LO driver having a second LO output and a second LO input, wherein the second LO input is coupled to the second output of the quadrature generation circuit; a first power connection coupled to the first LO output and the second LO output to provide spur suppression associated with a phase difference between the first LO signal and the second LO signal: a first mixer having a first mixer LO input, a first mixer radio frequency (RF) input, and a first mixer IF output, wherein the first mixer LO input is coupled to the first LO output, and wherein the first mixer RF input is coupled to an RF signal source: a second mixer having a second mixer LO input, a second mixer RF input, and a second mixer IF output, wherein the second mixer LO input is coupled to the second LO output, and wherein the first mixer RF input is coupled to a dummy RF load: and a second power connection coupled to the first mixer IF output and the second mixer IF output to provide spur suppression associated with the phase difference between the first LO signal and the second LO signal.

Aspect 2. The wireless communication apparatus of Aspect 1 or 1A, wherein the LO source, the quadrature generation circuit, the first LO driver, the second LO driver, the first power connection, the first mixer, the second mixer and the second power connection are associated with a first channel of a carrier aggregation (CA) receiver.

Aspect 3. The wireless communication apparatus of Aspect 2, further comprising a second IF input configured to provide a second IF signal from a second LO path and a second RF input associated with a second channel of the CA receiver: and an IF output, wherein the IF output is coupled to the second IF input, and wherein the IF output is further coupled to the first mixer IF output via a first IF input.

Aspect 4. The wireless communication apparatus of Aspect 3, further comprising an analog-to-digital converter configured to convert a merged IF signal for the first channel and the second channel from an analog RF signal to a digital signal.

Aspect 5. The wireless communication apparatus of Aspect 4, further comprising a modem circuit coupled to an output of the analog-to-digital converter.

Aspect 6. The wireless communication apparatus of any of Aspects 1 (or 1A) to 5, further comprising control circuitry coupled to the second LO driver and the second mixer, wherein the control circuitry is configured to set the second LO driver and the second mixer to a low power off state when the wireless communication apparatus is configured for an operating state without suppression of spurs.

Aspect 7. The wireless communication apparatus of any of Aspects 1 (or 1A) to 6, wherein the first power connection is coupled to the first LO output via a first inductive element, and wherein the second LO output is coupled to the first power connection via a second inductive element different than the first inductive element.

Aspect 8. The wireless communication apparatus of Aspect 7, wherein the first mixer IF output and the second mixer IF output are coupled to the second power connection via a shared inductive element.

Aspect 9. The wireless communication apparatus of Aspect 8, wherein the first mixer IF output is coupled to the second power connection via a third inductive element, and wherein the second mixer IF output is coupled to the second power connection via a fourth inductive element different than the third inductive element.

Aspect 10. The wireless communication apparatus of any of Aspects 1 (or 1A) to 9, wherein the dummy RF load comprises a resistor matched to an input resistance associated with the RF signal source.

Aspect 11. The wireless communication apparatus of any of Aspects 1 (or 1A) to 10, wherein the RF signal source comprises one or more receiver input configured to provide RF signals at frequencies between 37 gigahertz (GHz) and 43.5 GHz.

Aspect 12. The wireless communication apparatus of any of Aspects 1 (or 1A) to 11, wherein the RF signal source comprises one or more receiver input configured to provide RF signals at frequencies between 24 gigahertz (GHz) and 29.5 GHz.

Aspect 13. The wireless communication apparatus of any of Aspects 1 (or 1A) to 12, further comprising: one or more millimeter wave (mmW) antennas coupled to the first mixer RF input as part of the RF signal source.

Aspect 14. A millimeter wave (mmW) receiver comprising: a local oscillator (LO) generator: a splitter coupled to the LO generator configured to output a first LO signal from a first output and a second LO signal from a second output: a 90-degree phase shifter having an output and an input coupled to the second output of the splitter: a radio frequency (RF) input: a first mixer having an output, a first input coupled to the RF input, and a second input coupled to the first output of the splitter: a second mixer having an output, a first input coupled to the RF input, and a second input coupled to the output of the 90-degree phase shifter: a 180-degree phase shifter having an output and an input coupled to the output of the second mixer: and a combiner element having an intermediate frequency (IF) output, a first input coupled to the output of the first mixer, and a second input coupled to the output of the 180-degree phase shifter.

Aspect 15. The mmW receiver of Aspect 14, further comprising: a first switch coupled between the RF input and the input of the second mixer: and a second switch coupled between the output of the 180-degree phase shifter and the second input of the combiner element.

Aspect 16. The mmW receiver of Aspect 15, further comprising control circuitry configured to open the first switch and the second switch when the mmW receiver is configured for a CA operation mode where a harmonic of an IF signal output from the first mixer does not interfere with a carrier of the CA operation mode.

Aspect 17. The mmW receiver of Aspect 16, further comprising control circuitry configured to close the first switch and the second switch when the mmW receiver is configured for a CA operation mode where a harmonic of an IF signal output from the first mixer interferes with a second carrier of the CA operation mode, wherein the IF signal output from the first mixer is associated with a first carrier different than the second carrier.

Aspect 18. A wireless communication apparatus, comprising: a local oscillator (LO) source having an LO output for an LO signal: splitter phase shifting circuitry or phase shifting circuitry having an input coupled to the LO output, and a plurality of outputs, the plurality of outputs including at least a first output for a first LO signal, and a second output for a second LO signal, wherein each output of the plurality of outputs other than the first output is configured with a signal out of phase the first LO signal: a plurality of LO drivers, each LO driver of the plurality of LO drivers comprising corresponding an LO driver input coupled to a corresponding output of the plurality of outputs of the splitter phase shifting circuitry: and one or more power connections coupled between groupings of outputs of the plurality of LO drivers, wherein the one or more power connections provide spur suppression associated with a phase difference between the outputs of the plurality of LO drivers in an associated grouping.

Aspect 19. The wireless communication apparatus of Aspect 18, wherein a first power connection of the one or more power connections associated with a first grouping of the groupings of the outputs of the plurality of LO drivers provides first spur suppression for a second order harmonic of the first LO signal.

Aspect 20. The wireless communication apparatus of Aspect 19, wherein a second power connection of the one or more power connections associated with a second grouping of the groupings of the outputs of the plurality of LO drivers provides second spur suppression for a third order harmonic of the first LO signal.

Aspect 21. The wireless communication apparatus of any of Aspects 18 to 20, further comprising: a plurality of mixers, each mixer of the plurality of mixers having a mixer LO input coupled to a corresponding output of the outputs of the plurality of LO drivers: second one or more power connections coupled between groupings of outputs of the plurality of mixers, wherein the second one or more power connections provide spur suppression associated with a phase difference between the outputs of the plurality of LO drivers in an associated grouping.

Aspect 22. The wireless communication apparatus of Aspect 21, wherein each mixer of the plurality of mixers comprises a corresponding mixer radio frequency (RF) input, and a corresponding mixer IF output, wherein a first mixer of the plurality of mixers has a first input coupled to the first output for the first LO signal, wherein the corresponding mixer RF input for the first mixer is coupled to an RF signal source, and where each mixer of the plurality of mixers other than the first mixer has the corresponding RF input coupled to a corresponding dummy RF load.

Aspect 23. The wireless communication apparatus of Aspect 22, wherein a first power connection of the second one or more power connections provides first spur suppression for a second order harmonic of the first LO signal, wherein a second power connection of the second one or more power connections provides second spur suppression for a third order harmonic of the first LO signal, and, wherein a third power connection of the second one or more power connections provides third spur suppression for a fourth order harmonic of the first LO signal.

Aspect 24. A method comprising: generating a first LO signal at a first millimeter wave (mmW) frequency: generating a second LO signal at the first mmW frequency, wherein the second LO signal is out of phase with the first LO signal; generating a harmonic of the first LO signal: and generating a harmonic of the second LO signal such that the harmonic of the second LO signal is 180 degrees out of phase with the harmonic of the first LO signal with an approximately matching amplitude.

Aspect 25. The method of Aspect 24, further comprising communicating the first LO signal and the harmonic of the first LO signal to a first parasitic path associated with a second receiver path associated with a second carrier: and communicating the second LO signal and the harmonic of the second LO signal to the first parasitic path, such that the harmonic of the second LO signal suppresses the harmonic of the first LO signal, wherein the first LO signal is associated with a first carrier different than the second carrier.

Aspect 26. The method of Aspect 25, further comprising generating the second LO signal by closing a first switch and a second switch using control circuitry based on a carrier aggregation (CA) operation mode where the harmonic of the first LO signal interferes with the second carrier of the CA operation mode.

Aspect 27. The method of any of Aspects 24 to 26, wherein: the first LO signal and the second LO signal are generated using a quadrature generation circuit having an input coupled to an LO output of an LO generator, a first output for the first LO signal, and a second output for the second LO signal, wherein the second LO signal is 90 degrees out of phase with the first LO signal: and the harmonic of the first LO signal and the harmonic of the second LO signal are generated using: a first LO driver having a first LO output and a first LO input, wherein the first LO input is coupled to the first output of the quadrature generation circuit: a second LO driver having a second LO output and a second LO input, wherein the second LO input is coupled to the second output of the quadrature generation circuit: a first mixer having a first mixer LO input, a first mixer radio frequency (RF) input, and a first mixer IF output, wherein the first mixer LO input is coupled to the first LO output, and wherein the first mixer RF input is coupled to an RF signal source; and a second mixer having a second mixer LO input, a second mixer RF input, and a second mixer IF output, wherein the second mixer LO input is coupled to the second LO output, and wherein the first mixer RF input is coupled to a dummy RF load.

Aspect 28. The method of Aspect 27, wherein: a first power connection is coupled to the first LO output and the second LO output to provide spur suppression associated with a phase difference between the first LO signal and the second LO signal: and a second power connection is coupled to the first mixer IF output and the second mixer IF output to provide spur suppression associated with the phase difference between the first LO signal and the second LO signal.

Aspect 29. A wireless communication receiver comprising: means for generating a first LO signal at a first millimeter wave (mmW) frequency: means for generating a second LO signal at the first mmW frequency, wherein the second LO signal is out of phase with the first LO signal: means for generating a harmonic of the first LO signal: and means for generating a harmonic of the second LO signal such that the harmonic of the second LO signal is 180 degrees out of phase with the harmonic of the first LO signal with a matching amplitude.

Aspect 30. The wireless communication receiver of Aspect 29, further comprising: a first parasitic path coupling the first LO signal and the harmonic of the first LO signal to a second receiver path associated with a second carrier: and a second path coupling the second LO signal and the harmonic of the second LO signal to the first parasitic path, such that the harmonic of the second LO signal suppresses the harmonic of the first LO signal, wherein the first LO signal is associated with a first carrier different than the second carrier.

Aspect 31: The wireless communication apparatus of Aspect 9, wherein the first mixer output is differential and wherein the second mixer output is differential, and wherein each combination of the differential first mixer output and the differential second mixer output is coupled together by a respective capacitor.

Aspect 32: The wireless communication apparatus of any of Aspects 1 (or 1A) to 13 or 31, wherein the second LO driver, the second mixer, or the dummy RF load are programmable.

Aspect 33: The mmW receiver of Aspect 15, further comprising a third switch coupled between the RF input and the input of the first mixer, and a fourth switch coupled between the output of the first mixer and the combiner element.

Aspect 34: The mmW receiver of Aspect 14, further comprising a bias coupled to the second mixer, the bias being configured to selectively disable the second mixer, and wherein the 90-degree phase shifter is configured to be selectively disabled.

Aspect 35: The mmW receiver of Aspect 14, further comprising a first bias coupled to the first mixer and a second bias coupled to the second mixer, the first bias and the second bias configured to selectively disable the first mixer and the second mixer, respectively, wherein the mmW receiver further comprises a first circuit coupled between the first output of the splitter and the first mixer and a second circuit coupled between the second output of the splitter and the second mixer, the first circuit configured to selectively disconnect the first LO signal from the first input of the first mixer, and the second circuit configured to selectively disconnect the second LO signal from the first input of the second mixer.

Aspect 36: A non-transitory computer readable storage medium comprising instructions that, when executed by processing circuitry of a device, cause the device to perform operations in accordance with any of Aspects 1 to 35.

Aspect 37. A method performed by a device in accordance with any of Aspects 1 to 35.

Aspect 38. A wireless communication apparatus comprising means for performing operations in accordance with any of Aspects 1 to 35.

What is claimed is:
1. A wireless communication apparatus, comprising:
a local oscillator (LO) source having an LO output for an LO signal;

a quadrature generation circuit having an input coupled to the LO output, a first output for a first LO signal, and a second output for a second LO signal, wherein the second LO signal is 90 degrees out of phase with the first LO signal;

a first LO driver having a first LO output and a first LO input, wherein the first LO input is coupled to the first output of the quadrature generation circuit;

a second LO driver having a second LO output and a second LO input, wherein the second LO input is coupled to the second output of the quadrature generation circuit;

a first power connection coupled to the first LO output and the second LO output;

a first mixer having a first mixer LO input, a first mixer radio frequency (RF) input, and a first mixer output, wherein the first mixer LO input is coupled to the first LO output, and wherein the first mixer RF input is coupled to an RF signal source;

a second mixer having a second mixer LO input, a second mixer RF input, and a second mixer output, wherein the second mixer LO input is coupled to the second LO output, and wherein the first mixer RF input is coupled to a dummy RF load; and a second power connection coupled to the first mixer output and the second mixer output.

2. The wireless communication apparatus of claim 1, wherein the LO source, the quadrature generation circuit, the first LO driver, the second LO driver, the first power connection, the first mixer, the second mixer and the second power connection are associated with a first channel of a carrier aggregation (CA) receiver.

3. The wireless communication apparatus of claim 2, further comprising a second input configured to provide a downconverted signal from a second LO path and a second RF input associated with a second channel of the CA receiver; and an output, wherein the output is coupled to the second input, and wherein the output is further coupled to the first mixer output and the second mixer output via a first input.

4. The wireless communication apparatus of claim 3, further comprising an analog-to-digital converter configured to convert a merged signal for the first channel and the second channel from an analog signal to a digital signal.

5. The wireless communication apparatus of claim 4, further comprising a modem circuit coupled to an output of the analog-to-digital converter.

6. The wireless communication apparatus of claim 3, wherein the RF signal source comprises one or more receiver input configured to provide RF signals at frequencies between 37 gigahertz (GHz) and 43.5 GHz.

7. The wireless communication apparatus of claim 6, wherein the RF signal source comprises one or more receiver input configured to provide RF signals at frequencies between 24 gigahertz (GHz) and 29.5 GHz.

8. The wireless communication apparatus of claim 1, further comprising control circuitry coupled to the second LO driver and the second mixer, wherein the control circuitry is configured to set the second LO driver and the second mixer to an off state when the wireless communication apparatus is configured for an operating state without suppression of spurs.

9. The wireless communication apparatus of claim 1, wherein the first power connection is coupled to the first LO output via a first inductive element, and wherein the second LO output is coupled to the first power connection via a second inductive element different than the first inductive element.

10. The wireless communication apparatus of claim 9, wherein the first mixer output and the second mixer output are coupled to the second power connection via a shared inductive element.

11. The wireless communication apparatus of claim 9, wherein the first mixer output is coupled to the second power connection via a third inductive element, and wherein the second mixer output is coupled to the second power connection via a fourth inductive element different than the third inductive element.

12. The wireless communication apparatus of claim 1, wherein the dummy RF load comprises a resistor matched to an input resistance associated with the RF signal source.

13. The wireless communication apparatus of claim 1, further comprising:

one or more millimeter wave (mmW) antennas coupled to the first mixer RF input as part of the RF signal source.

14. A millimeter wave (mmW) receiver comprising:

a local oscillator (LO) generator;

a splitter coupled to the LO generator configured to output a first LO signal from a first output and a second LO signal from a second output;

a 90-degree phase shifter having an output and an input coupled to the second output of the splitter;

a radio frequency (RF) input;

a first mixer having an output, a first input coupled to the RF input, and a second input coupled to the first output of the splitter;

a second mixer having an output, a first input coupled to the RF input, and a second input coupled to the output of the 90-degree phase shifter;

a 180-degree phase shifter having an output, and an input coupled to the output of the second mixer;

a combiner element having an output, a first input coupled to the output of the first mixer, and a second input coupled to the output of the 180-degree phase shifter;

a first switch coupled between the RF input and the input of the second mixer; and a second switch coupled between the output of the 180-degree phase shifter and the second input of the combiner element.

15. The mmW receiver of claim 14, further comprising control circuitry configured to open the first switch and the second switch when the mmW receiver is configured for a CA operation mode where a harmonic of a signal output from the first mixer does not interfere with a carrier of the CA operation mode.

16. The mmW receiver of claim 14, further comprising control circuitry configured to close the first switch and the second switch when the mmW receiver is configured for a CA operation mode where a harmonic of an IF signal output from the first mixer interferes with a second carrier of the CA operation mode, wherein the IF signal output from the first mixer is associated with a first carrier different than the second carrier.

17. A wireless communication apparatus, comprising:

a local oscillator (LO) source having an LO output for an LO signal;

phase shifting circuitry having an input coupled to the LO output, and a plurality of outputs, the plurality of outputs including at least a first output for a first LO signal, and a second output for a second LO signal, wherein each output of the plurality of outputs other than the first output is configured with a signal out of phase with the first LO signal;

a plurality of LO drivers, each LO driver of the plurality of LO drivers comprising a corresponding LO driver input coupled to a corresponding output of the plurality of outputs of the phase shifting circuitry; and one or more power connections coupled between groupings of outputs of the plurality of LO drivers, wherein the one or more power connections provide spur suppression associated with a phase difference between the outputs of the plurality of LO drivers in an associated grouping.

18. The wireless communication apparatus of claim 17, wherein first spur suppression for a second order harmonic of the first LO signal occurs at a first power connection of the one or more power connections associated with a first grouping of the groupings of the outputs of the plurality of LO drivers.

19. The wireless communication apparatus of claim 18, wherein second spur suppression for a third order harmonic of the first LO signal occurs at a second power connection of the one or more power connections associated with a second grouping of the groupings of the outputs of the plurality of LO drivers.

20. The wireless communication apparatus of claim 17, further comprising:

a plurality of mixers, each mixer of the plurality of mixers having a mixer LO input coupled to a corresponding output of the outputs of the plurality of LO drivers; and second one or more power connections coupled between groupings of outputs of the plurality of mixers, wherein spur suppression associated with a phase difference between the outputs of the plurality of LO drivers in an associated grouping occurs at the second one or more power connections.

21. The wireless communication apparatus of claim 20, wherein each mixer of the plurality of mixers comprises a corresponding mixer radio frequency (RF) input, and a corresponding mixer IF output, wherein a first mixer of the plurality of mixers has a first input coupled to the first output for the first LO signal, wherein the corresponding mixer RF input for the first mixer is coupled to an RF signal source, and where each mixer of the plurality of mixers other than the first mixer has the corresponding RF input coupled to a corresponding dummy RF load.

22. The wireless communication apparatus of claim 21, wherein a first spur suppression for a second order harmonic of the first LO signal occurs at a first power connection of the second one or more power connections, wherein second spur suppression for a third order harmonic of the first LO signal occurs at a second power connection of the second one or more power connections, and wherein third spur suppression for a fourth order harmonic of the first LO signal occurs at a third power connection of the second one or more power connections.

23. The wireless communication apparatus of claim 21, wherein the first mixer output is differential and wherein the second mixer output is differential, and wherein each combination of the differential first mixer output and the differential second mixer output is coupled together by a respective capacitor.

24. The wireless communication apparatus of claim 21, wherein the second LO driver, the second mixer, or the dummy RF load are programmable.

25. A method comprising:

generating a first LO signal at a first millimeter wave (mmW) frequency;

generating a second LO signal at the first mmW frequency, wherein the second LO signal is out of phase with the first LO signal;

generating a harmonic of the first LO signal; and generating a harmonic of the second LO signal such that the harmonic of the second LO signal is 180 degrees out of phase with the harmonic of the first LO signal with an approximately matching amplitude, wherein the first LO signal and the second LO signal are generated using a quadrature generation circuit having an input coupled to an LO output of an LO generator, a first output for the first LO signal, and a second output for the second LO signal, wherein the second LO signal is 90 degrees out of phase with the first LO signal, and wherein the harmonic of the first LO signal and the harmonic of the second LO signal are generated using:

a first LO driver having a first LO output and a first LO input, wherein the first LO input is coupled to the first output of the quadrature generation circuit;

a second LO driver having a second LO output and a second LO input, wherein the second LO input is coupled to the second output of the quadrature generation circuit;

a first mixer having a first mixer LO input, a first mixer radio frequency (RF) input, and a first mixer output, wherein the first mixer LO input is coupled to the first LO output, and wherein the first mixer RF input is coupled to an RF signal source; and a second mixer having a second mixer LO input, a second mixer RF input, and a second mixer output, wherein the second mixer LO input is coupled to the second LO output, and wherein the first mixer RF input is coupled to a dummy RF load.

26. The method of claim 25, wherein the harmonics are further generated using a third switch coupled between the RF signal source and the first mixer RF input, and a fourth switch coupled between the first mixer output and a combiner element.

27. The method of claim 26, wherein the harmonics are further generated using a bias coupled to the second mixer, the bias being configured to selectively disable the second mixer, and wherein the quadrature generation circuit is configured to be selectively disabled.

28. The method of claim 27, wherein the harmonics are further generated using a first bias coupled to the first mixer and a second bias coupled to the second mixer, with the first bias and the second bias configured to selectively disable the first mixer and the second mixer, respectively.

* * * * *